US008824806B1

(12) United States Patent
Gayles et al.

(10) Patent No.: US 8,824,806 B1
(45) Date of Patent: Sep. 2, 2014

(54) SEQUENTIAL DIGITAL IMAGE PANNING

(75) Inventors: Edward J. Gayles, Tracy, CA (US);
Parmanand P. Kejriwal, Saratoga, CA (US)

(73) Assignee: Amazon Technologies, Inc., Reno, NV (US)

( * ) Notice: Subject to any disclaimer, the term of this patent is extended or adjusted under 35 U.S.C. 154(b) by 1191 days.

(21) Appl. No.: 12/715,919

(22) Filed: Mar. 2, 2010

(51) Int. Cl.
*G06K 9/34* (2006.01)
*G06K 9/48* (2006.01)

(52) U.S. Cl.
USPC .......................................... 382/199; 382/176

(58) Field of Classification Search
CPC . G06K 9/00463; G06T 3/40; G09G 2340/045
USPC ........................... 382/176, 180, 199, 257–259
See application file for complete search history.

(56) References Cited

U.S. PATENT DOCUMENTS

| 5,452,380 | A * | 9/1995 | Uehara et al. | 382/317 |
|---|---|---|---|---|
| 5,761,485 | A * | 6/1998 | Munyan | 715/839 |
| 6,594,401 | B1 * | 7/2003 | Metcalfe et al. | 382/275 |
| 6,980,699 | B1 * | 12/2005 | Okada | 382/284 |
| 7,602,972 | B1 * | 10/2009 | Wei et al. | 382/225 |
| 2002/0081030 | A1 * | 6/2002 | Slavin | 382/192 |
| 2003/0021476 | A1 * | 1/2003 | Di Federico et al. | 382/176 |
| 2003/0112358 | A1 * | 6/2003 | Hamada | 348/333.12 |
| 2006/0197782 | A1 * | 9/2006 | Sellers et al. | 345/660 |
| 2007/0002054 | A1 * | 1/2007 | Bronstein | 345/467 |
| 2007/0162878 | A1 * | 7/2007 | Lee | 715/864 |
| 2007/0217701 | A1 * | 9/2007 | Liu et al. | 382/234 |
| 2009/0091801 | A1 * | 4/2009 | Hong | 358/464 |
| 2010/0142806 | A1 * | 6/2010 | Malik et al. | 382/164 |
| 2010/0246890 | A1 * | 9/2010 | Ofek et al. | 382/105 |

OTHER PUBLICATIONS

Sylwester et al. ("A Trainable, Single-Pass Algorithm for Column Segmentation," IEEE Proc. Document Analysis and Recognition, vol. 2, Sep. 1995, pp. 615-618).*
Lee et al. ("The embedded zooming applications for personal digital applications," IEEE Int'l Conf. on Personal Computing, Sep. 21-24, 2003, pp. 109-116).*
Sugiyama et al. ("A basic concept of displaying electronic text with seamless pages—magnifying and simplifying system for text extension (MaSSTExt)," IEEE World Congress on Nature and Biologically Inspired Computing, Dec. 9-11, 2009).*

* cited by examiner

*Primary Examiner* — Yubin Hung
(74) *Attorney, Agent, or Firm* — Lee & Hayes, PLLC

(57) ABSTRACT

Content portions to be presented on a display of an electronic device are identified by designating portions of a digital image as content regions and other portions of the digital image as non-content regions. The content portions are then identified from within the content region, in which each content portion has a predetermined width. Each content portion is then expanded to produce an expanded content portion. Each expanded content portion is presented on a display of an electronic device in a sequential manner.

37 Claims, 12 Drawing Sheets

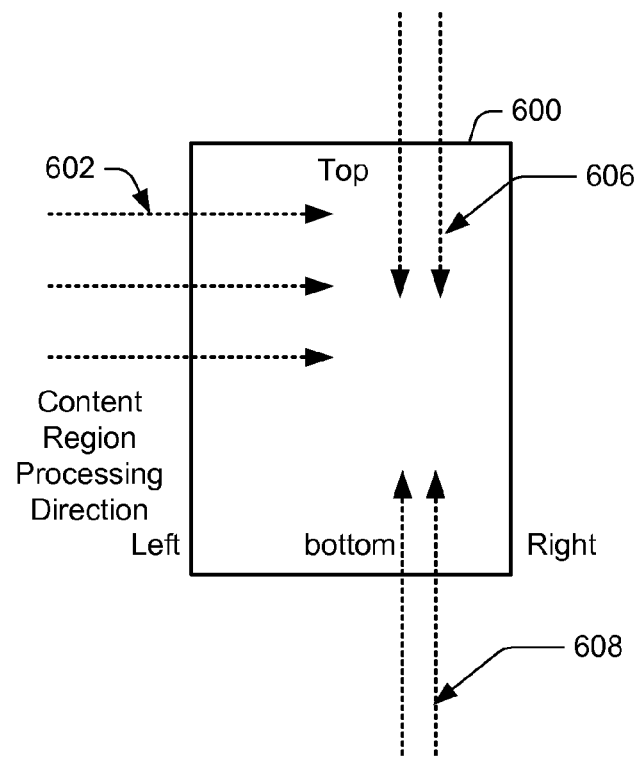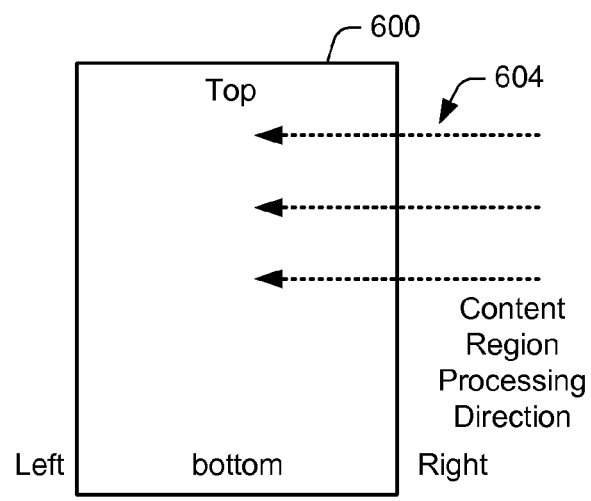
FIG. 6

SEQUENTIAL DIGITAL IMAGE PANNING

BACKGROUND

Content is increasingly being distributed in electronic form to an array of users for use on computing devices. Content may include traditional media such as books, magazines, newspapers, newsletters, manuals, guides, references, articles, reports, documents, and the like. The content may initially exist in print and/or in electronic form, and in the case of the print form, may be transformed from print to an electronic form through the use of an imaging device. Consequently, as more content is transformed from print to electronic form, more digital images of content are becoming available. In some instances, electronic content may be formatted to replicate an image of content as it appeared or would appear in print.

Content that is transformed from print to electronic form may retain content layouts that are optimized for presentation of the content in print format. Thus, some electronic display may lack size or resolution to display an image of the transformed electronic content in its entirety in a clear manner. Some of such computing devices may include one or more zoom modes that enable a user to zoom into a portion of the text or graphics that is in the electronic form for clear viewing, as well as zoom out to display the entire page of transformed electronic content.

BRIEF DESCRIPTION OF THE DRAWINGS

The detailed description is described with reference to the accompanying figures. In the figures, the left-most digit(s) of a reference number identifies the figure in which the reference number first appears. The same reference numbers in different figures indicate similar or identical items.

FIG. 6 shows the processing directions employed during the processing for the content regions and word division of a digital image.

DETAILED DESCRIPTION

Overview

Figure 1:
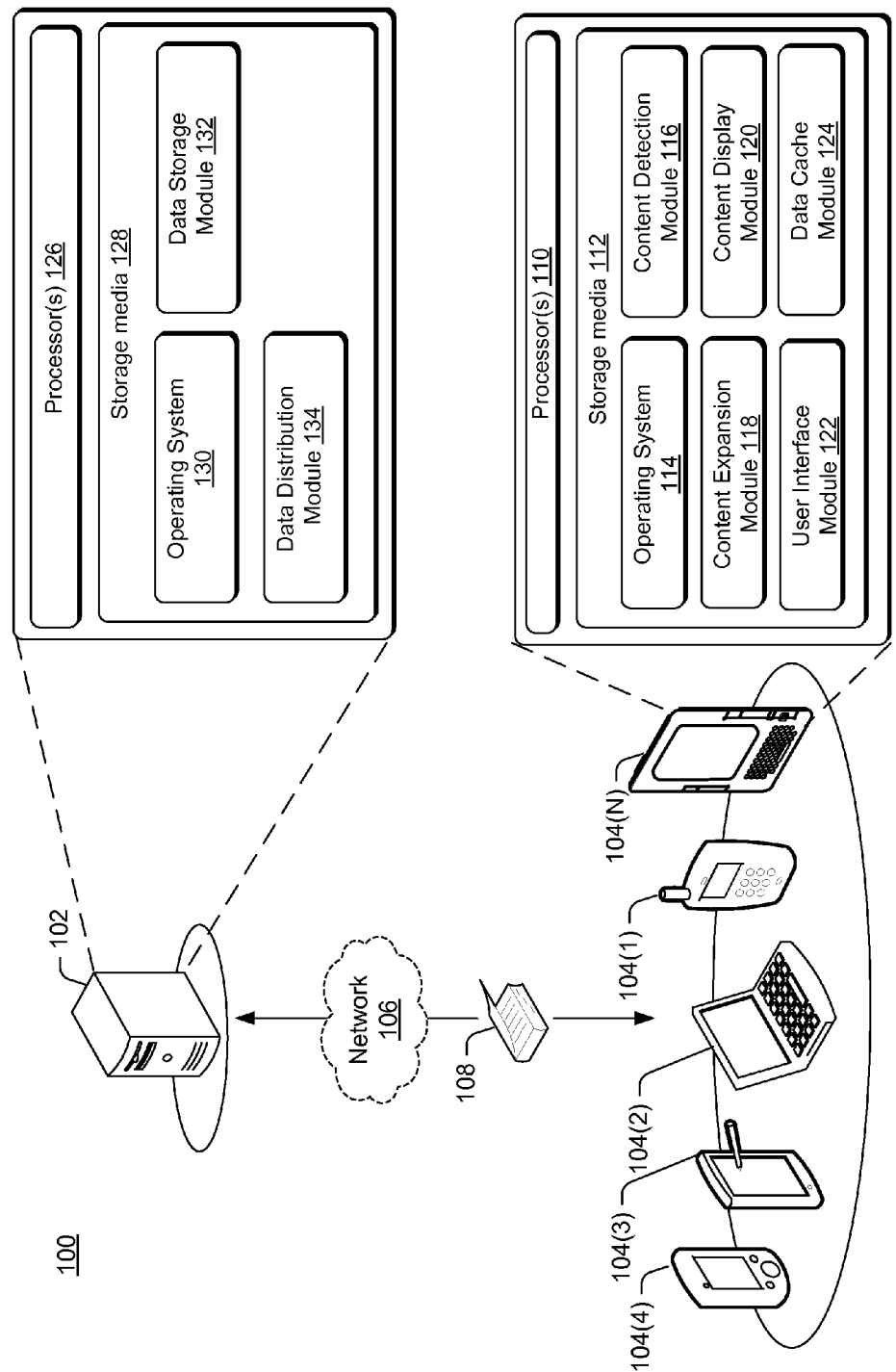
FIG. 1 shows an illustrative computing environment in which one or more embodiments of sequential digital image panning may be implemented.

The disclosure is directed techniques for the continuous display of expanded content that is in a digital image once the digital image is displayed in a zoom mode. Zoom mode may refer to any display technique in which a selected portion of a digital image is enlarged for display on an electronic display. For example, a computer device may include a user interface that enables a user to zoom into a portion of a displayed digital image so that the zoomed-in portion fills up some or the entire display area of an electronic display. In such an example, the user interface may further include one or more user interface tools that enable the user to determine the degree of magnification and/or a size of a field of view. Thus, the amount of magnification may be increased at the expense of the size of field of view, and vice versa.

Moreover, the user interface may enable the user to exit from the zoom mode. The user interface used to control a typical zoom mode may also include navigation tools (e.g. panning buttons or a touch screen gesture interpreter) that enable a user to maintain the degree of magnification while changing the portion of the digital image that is expanded and displayed.

However, with use of conventional tools, the use of such manual panning may cause the user to lose track of visual context cues that indicate where in the digital image the expanded portion is located. The loss of such visual context cues may lead to confusion regarding the content of the digital image. Content confusion problems caused by the loss of visual context cues may be especially acute when a high degree of magnification is being used, as the size of the field view may become very small. Thus, in some instances, a user may be forced to exit the zoom mode, reorient with respect to the overall digital image, and reapply the zoom mode to once again expand the same or different portions of the content for closer examination.

The sequential digital image panning techniques disclosed herein, meanwhile, enable a user to continuously and sequentially move around different expanded portions of a digital image without resorting to manually panning around the digital image. Accordingly, the sequential digital image panning techniques described herein alleviate content confusion problems caused by manually panning around the digital image, while providing a user with the ability to view the content of the digital image on an electronic display entirely in a zoom mode.

In various embodiments, the content portions of a digital image to be presented for sequential viewing may be identified and displayed by designating a digital image into content regions and non-content regions. The content portions are then identified from each content region. Each content portion is then expanded to produce an expanded content portion. Each expanded content portion is presented on a display of an electronic device in a sequential manner, thus allowing the user to continuously view a zoomed-in digital image without content confusion problems that users of conventional tools typically experience.

For purposes of discussion, the sequential digital image panning techniques may be described with respect to the manipulation of the digital image and/or its content. However, it is understood that the actual manipulation may be performed in memory with respect to the underlying data file that drives the presentation of the digital image. An illustrative environment and techniques for performing sequential digital image panning is provided below. However, the described sequential digital image panning techniques may be implemented in multiple other environments.

Illustrative System Architecture

FIG. 1 shows an illustrative computing environment 100 in which one or more embodiments of sequential digital image panning may be implemented. The environment 100 includes a server 102 and a plurality of electronic devices 104 that are communicatively connected by a network 106.

The network 106 may be a local area network ("LAN"), a larger network such as a wide area network ("WAN"), or a collection of networks, such as the Internet. Protocols for network communication, such as TCP/IP, may be used to implement the network 106. Although embodiments are described herein as using a network such as the Internet, other distribution techniques may be implemented that transmit information via memory cards, flash memory, or other portable memory devices. The electronic devices 104 may include a mobile phone 104(1), a portable computer 104(2), a tablet computer 104(3), a personal digital assistant (PDA) 104(3), an electronic book reader device (or, an "eBook reader device") 104(N), and/or other electronic devices that are equipped with network communication components, data processing components, and electronic displays for displaying data.

In one or more embodiments, each of the electronic devices 104 may receive one or more digital images from the server 102 via the network 106. In response, each of the electronic devices 104 may display the one or more of the digital images on a corresponding electronic display. The one or more digital images may be received on each of the electronic devices 104 from the server 102 as a part of at least one digital image collection 108. The electronic display may be a liquid crystal display (LCD), organic light emitting diode (OLED) display, a plasma display, an electronic paper display (e.g., an electrophoretic display), or any other form of electronic display that is capable presenting data in color, monochrome, and/or grayscale.

The one or more digital images may be presented on an electronic display via a software application (e.g., a document viewer application) that converts the one or more digital images from a storage format into graphical display data suitable for display on the electronic display. In accordance with various embodiments, the one or more digital images may correspond to one or more traditional pages of text, fonts, images, and/or vector graphics. In accordance with one or more embodiments, the one or more digital images may be in the form of a Portable Document Format (PDF) file, a word processing document file, an image file, and the like.

In various embodiments, the digital image may be, but is not limited to, a page from a book, magazine, an advertisement, a newspaper, a newsletter, a manual, a guide, a reference, an article, a report, and/or any other work for visually transmitting information. A collection of digital images (or, a "digital image collection" as referred to herein) may be, but is not limited to, a series of digital images corresponding to pages of a book, a magazine, an advertisement, a newspaper, a newsletter, a manual, a guide, a reference, an article, a report and/or any other work that may be represented as one or more digital images.

A digital image may include reproduction of content, as well as reproduction of margins that surround the content. Content of a digital image may include one or more of letters, characters, symbols, numbers, formulas, graphics, line drawings, table borders, images, textual content, and the like, that are used to visibly present information. Margins refer to the area that surrounds the content of a digital image.

In one or more embodiments, a digital image may be created via the optical scanning and digitalization of a corresponding page of traditional content. For instance, an optical character recognition (OCR) device or other suitable techniques may be used to identify and convert recognizable text in the traditional content into a digital image or selectable text (e.g., ASCII text).

As described herein, each digital image may be enlarged for display on an electronic display. The electronic display may refer to any display technology that electronically renders an image, such as a cathode ray tube (CRT) display, a liquid crystal display (LCD), a plasma display, a light emitting diode (LED) display, or an electronic paper display.

Each of the electronic devices 104 may further include user controls that enable a user to request the one or more digital images, or the one or more digital image collections 108 from the server 102. User controls may include, but are not limited to, combinations of one or more of keypads, keyboards, mouse devices, touch screens, microphones, speech recognition packages, and any other suitable devices or other electronic/software selection methods. Moreover, as further described below, each of the electronic devices 104 may also include a memory cache for storing the digital image collection 108.

As shown in FIG. 1, each of the electronic devices 104, such as the eBook reader device 104(N), may include one or more processors 110 and a storage media 112. The storage media 114 may store an operating system 114, as well as other modules that facilitate the sequential digital image panning. The operating system 114 may include components that enable the eBook reader device 104(N) to receive and transmit data via various inputs (e.g., user controls, network interfaces, and/or memory devices), process data using the one or more processors 110 to generate output. The operating system 114 may include a display component that presents the output (e.g., display the data on an electronic display, store the data in memory, transmit the data to another electronic device, etc.). Additionally, the operating system 114 may include other components that perform various other functions generally associated with an operating system.

The modules may include routines, programs, objects, components, and data structures that cause the eBook reader device 104(N) to perform particular tasks. The modules may include a content detection module 116, a content expansion module 118, a content display module 120, user interface module 122, and a data cache module 124. The sequential digital image panning, as facilitated by the various modules, is illustrated with respect to FIGS. 2-3.

Figure 2:
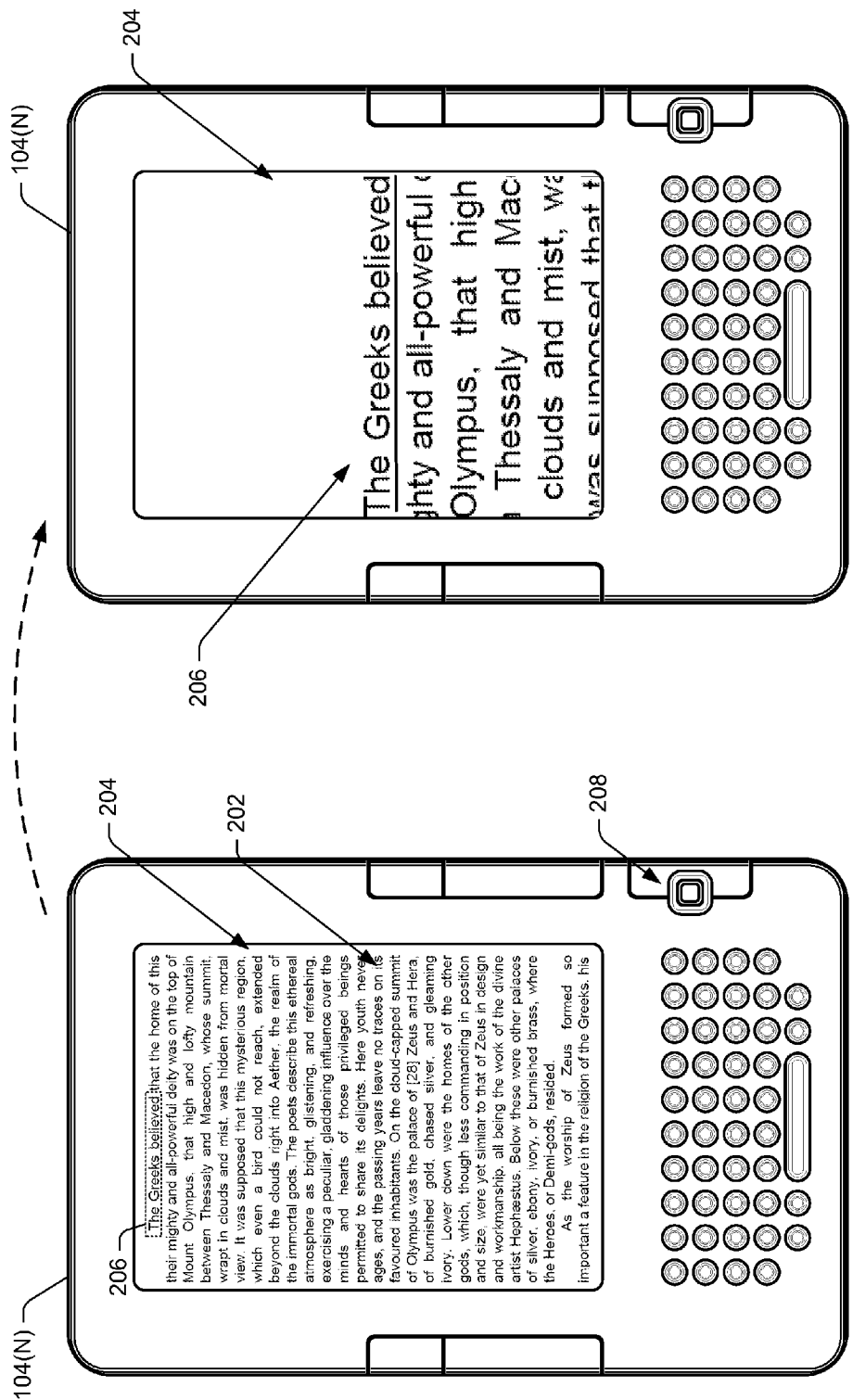
FIG. 2 shows illustrative display of an expanded content portion of a digital image via sequential digital image panning to facilitate viewing of the digital image.

FIG. 2 shows illustrative display of an expanded content portion of a digital image 202 via sequential digital image panning to facilitate viewing of the digital image. The display of the expanded content portion of the digital image 202 may be part of the sequential digital image panning. As shown in FIG. 2, the digital image 202 of the digital image collection 108 may be displayed in its entirety in a display 204 of an electronic device 104, such as the eBook reader device 104 (N). The digital image 202 may include lines of text, or content regions, which are separated by non-content regions (e.g., line spaces).

In various embodiments, the electronic device 104(N) may be triggered to enter a sequential digital image panning mode. In such a mode, the various modules in the electronic device 104 may expand the digital image 202 and pan to a content portion of the digital image 202. In at least one embodiment, the panning of the digital image 202 may shift the digital image 202 so that an expanded content portion is displayed in a central location (e.g., vertically centered or substantially vertically centered) in the display 204. In this way, user readability of the expanded content portion may be improved. For example, but not as a limitation, the digital image 202 may include a first line of text that reads "The Greeks believed that the home of this". Thus, the various modules may expand the digital image 202 so that the content portion 206 that includes the text "The Greeks believed" fills a majority of or the entire width of the display 204. Further, the various modules may also pan across the digital image 202 so that the content portion 206 is centrally positioned in the display 204. In this way, the content portion 206 is more easily viewed by a user.

In some embodiments, the sequential digital image panning may be triggered via user controls of the electronic device 104. The user controls may include, but are not limited to, combinations of one or more of keypads, keyboards, mouse devices, touch screens, microphones, speech recognition packages, and any other suitable devices or other electronic/software selection methods. For example, but not as a limitation, the electronic device 104 may enter the sequential digital image panning mode when a button 208 of the user controls is activated.

In other embodiments, the user controls of the electronic device 104 may include additional software and/or hardware controls that provide a user with the ability to adjust the degree of magnification. Thus, the size of the content in the content portion 202 may vary according to the degree of magnification. For example, the size of the text in the digital image 202, including the text "the Greeks believed" in the content portion 206, may get bigger as the degree of magnification is increased, and smaller as the degree of magnification is decreased. In some embodiments, the sequential digital image panning mode may maximize the amount of content that is displayed in the display 204 as the degree of magnification changes.

Thus, the amount of content in the content portion 202 may vary according to the degree of magnification. For example, FIG. 2 illustrates the text "The Greeks believed" as the content portion 206 displayed across the display 204. However, as the degree of magnification increases, the content portion 206 that is displayed across the display 204 may only include the text "The Greeks", which may be displayed in a bigger font size than the text "The Greeks believed". Further, the sequential display of expanded content portions (e.g., expanded content portion 206) by an electronic device in the sequential electronic panning mode is illustrated in FIG. 3.

In at least one embodiment, the expanded content portion 206 may be provided with a visual indicator to show that the content portion 206 is the focus of the current expansion. In at least one embodiment, the visual indicator may be in the form of an underline that marks the original content of the content portion 206. However, the visual indicator may also take other forms in other embodiments, such as arrow marks, a surrounding rectangle, and/or the like. In additional embodiments where the display of the electronic display is a color display, the visual indicator may be in the form of different colors. For example, black may be used for the original text of the content portion 206, while blue may be used for the remainder of the content in the digital image 202. As further described in FIG. 3, the visual indicator may move to a different expanded content portion of a digital image as the user sequentially passes around a digital image while the digital image is magnified.

Figure 3:
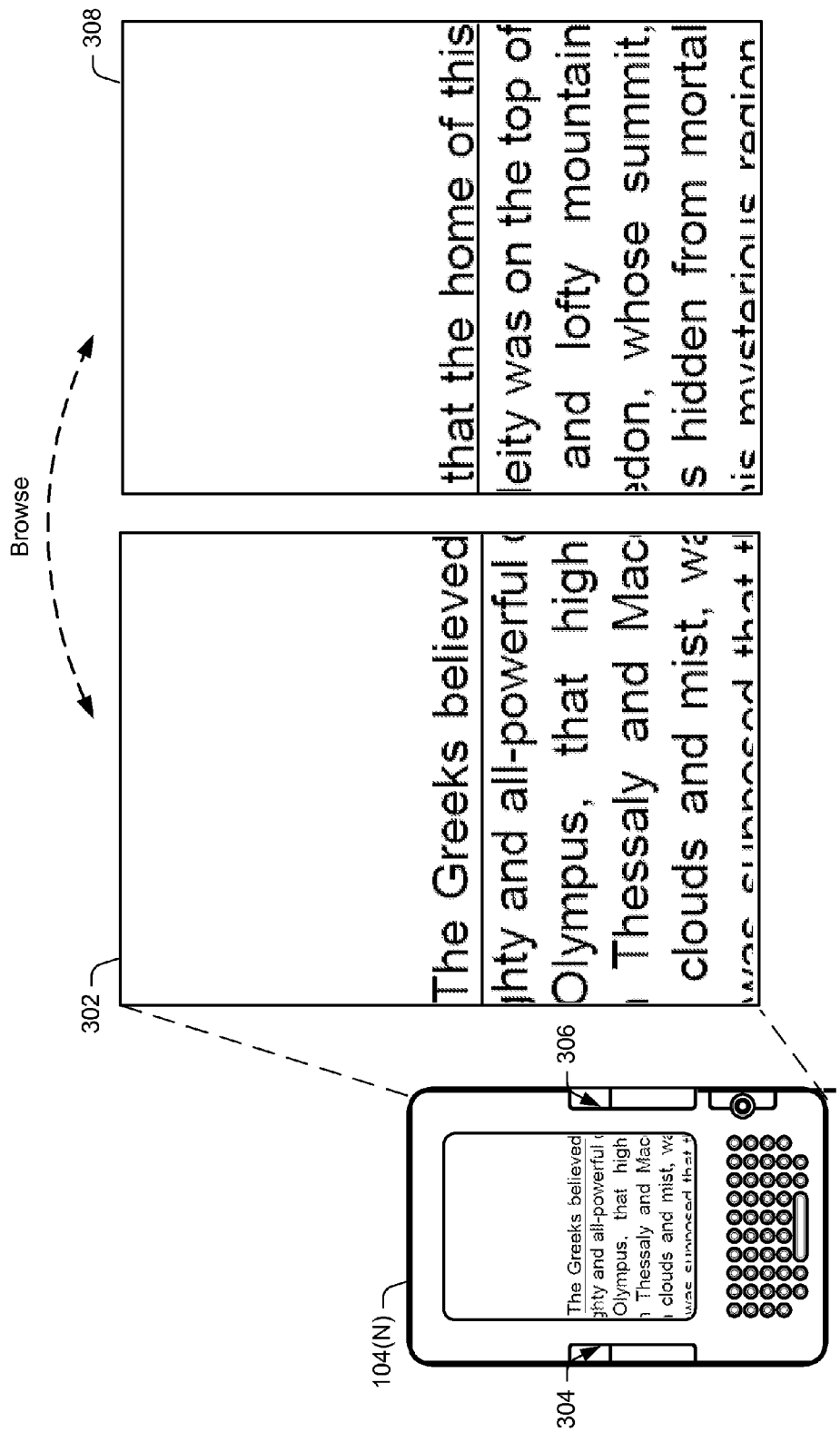
FIG. 3 shows an illustrative display transition between various expanded content portions of a digital image via sequential digital image panning.

FIG. 3 shows an illustrative display transition between various expanded content portions of a digital image. That is, FIG. 3 illustrates the display of the eBook reader device 104(N) as the user sequentially pans the digital image while the digital image is magnified.

As shown, screen image 302 may represent the content of the content portion 206 that is shown in the display 204. In various embodiments, the user controls of electronic device 104 may include controls, such as back control 304 and forward control 306, which enable a user to sequentially browse to additional content portions of the digital image 202, as well as back to the content of the content portion 206. For example, as shown in screen image 308, the forward control 306 may be activated (e.g., pressed) to cause the electronic device 104 to pan to the text that immediately follows the text "The Greeks believed", which may be "that the home of this". As a result, the expanded text "that the home of this" may fill a majority or entire width of the display 204, and is presented in the same or approximately the same central location (e.g., vertically centered or substantially vertically centered) in the display 204.

Moreover, additional activations of the forward control 306 may cause the electronic device 104 to pan to subsequent contents portion that are in the digital image 202 in the same manner. Conversely, each activation of the back control 304 may cause the electronic device 104 to display of content that the digital image 202 that immediately precedes the currently display content in the same manner. For example, when the text "that the home of this" is displayed as shown in screen image 308, the activation of the back control 304 may cause the display of "The Greeks believed," or content portion 206, as shown in screen image 302. Further, when the current expanded text that is display in the display 204 is at end of a line of text, the activation of the forward control 306 may automatically cause the electronic device 104 to pan to and expand an additional content portion that is located at the beginning of the subsequent line of text, if available. Conversely, when the current expanded text that is displayed in the display 204 is at the beginning of a line of text, the activation of the back control 304 automatically cause the electronic device 104 to pan to and expand an additional content portion that is located at the end of the previously line of text, if available. Likewise, when the current expanded text is at the end of a digital image of a digital image collection 108 or the beginning of a digital image collection 108, the activation of the forward control 306 or back control 304, respectively, may cause the electronic device 104 to proceed to an additional content portion at the beginning of the next digital image in the collection or an additional content portion that is at the end of the previous digital image in the collection, if such digital images are available.

In some embodiments, the additional content portions may be displayed via the same degree of magnification as the content portion 206. Additionally, the sequential digital image panning mode may be configured to recognize word divisions (e.g., spaces) between words, so that each content portion that is displayed on the display 204 includes one or more complete words, rather than partial words. In this way, the sequential digital image panning mode facilitated by the various modules may enable a user to expand and pan through the digital image 202, as well other as other digital images of the digital image collection 108, via the user controls of the electronic device 104. The operations of the various modules are described in detail below.

Digital Image Content Portion Recognition

The implementation of the sequential digital image panning mode may initially involve the content detection module 116 making distinctions between content regions and non-content regions of a digital image. Each of the content regions may then be further divided into content portions for magnification and display on an electronic device, such as the electronic device 104(N).

Returning to FIG. 1, the content detection module 116 may distinguish the lines of content, such as text, that are present in a digital image from the space between the lines of text. In at least one embodiment, the content detection module 116 may perform this determination when a user triggers the display of a digital image via user controls. In other embodiments, the content detection module 116 may detect the lines of content prior to the trigger of the digital image display. The illustrative operation of the content detection module 116 is further described in FIG. 4.

Figure 4:
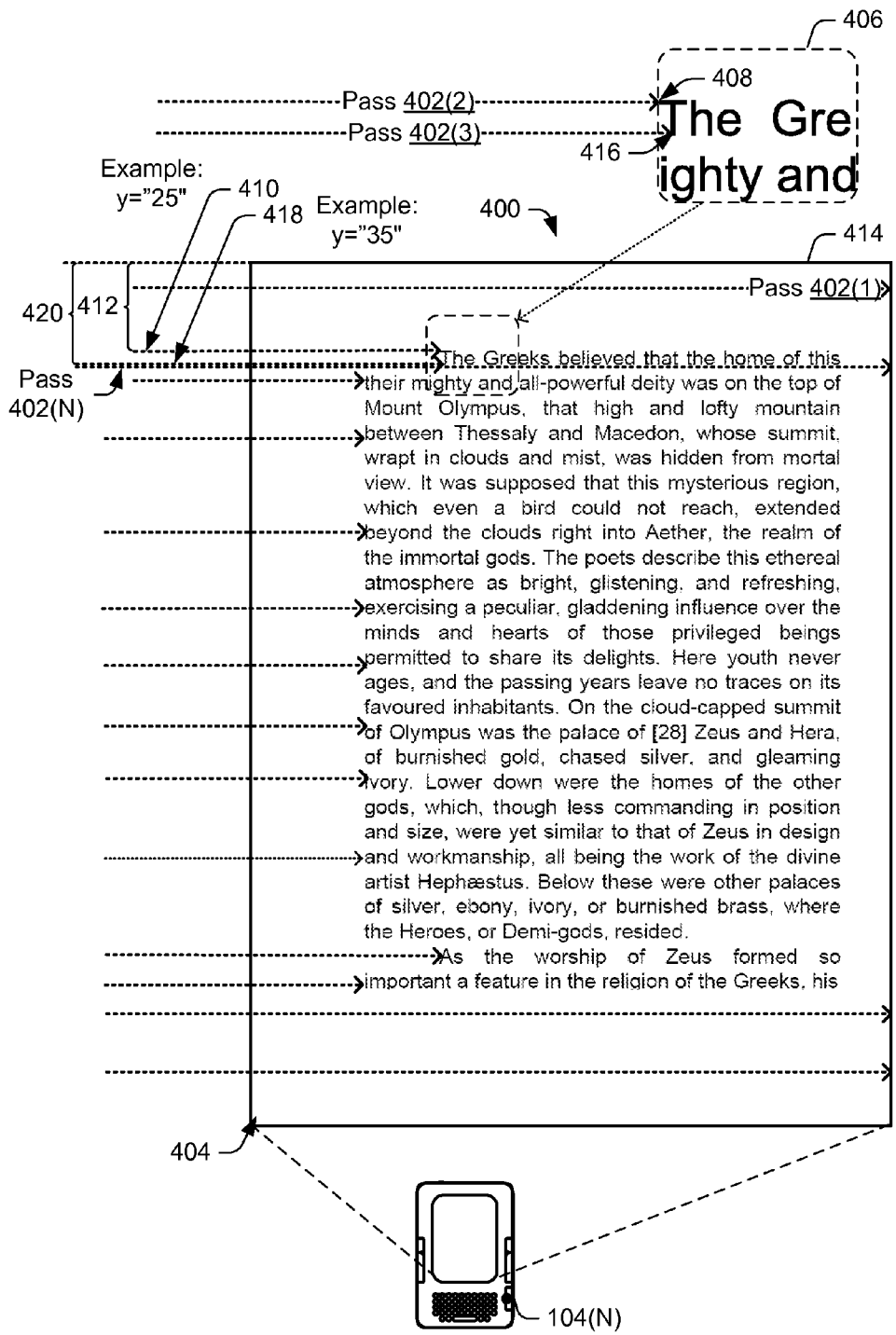
FIG. 4 shows illustrative processing of a digital image to determine the lines of content that are present in a digital image.

FIG. 4 shows illustrative processing of a digital image by a content detection module 116 to determine content regions, such as lines of text, that are present in a digital image 400. The content detection module 116 may make processing passes for each line of pixels that make up the content regions of the digital image 400, as illustrated by example arrows 402(1)-402(N). During each pass, the content detection module 116 may determine that content is reached when a pixel with a color value that is different from the color value of the background of the digital image 400. In some embodiments, the color value of background may be the predominant color of the digital image 400 (i.e., a color that is present in the most area of the digital image 400). In other embodiments, the color value of the background may be the color value of one or more corner regions, such as corner region 404, as these regions are most likely to be background rather than containing content.

In the example shown in FIG. 4, the content detection module 116 makes a processing pass 402(1) across the digital image 400 without detecting a color value that is different from the color value of the background of the digital image. Subsequently, the content detection module 116 may make a processing passing 402(2). As shown in expanded view 406, the content detection module 116 detects a color value change at a position 408 as the processing pass 402(2) reaches the letter "T" in the word "The". At this point, the content detection module 116 may make a notation regarding a first vertical coordinate 410 of the location 408. The vertical coordinate 410 (e.g., y=25) may indicate a vertical offset 412 (e.g., 25 pixels) of the location 408 from a top edge 414 of the digital image 400. Subsequently, the content detection module 116 proceeds with further processing passes in the instant example.

During each further processing pass, the content detection module 116 may continuously make such detections of color value changes, as well as note respective vertical coordinates of the detection as a pixel line by pixel line basis. In the example shown in FIG. 4, at processing pass 402(3), the content detection module 116 detects another color value change at a location 416 as the processing pass reaches a lower line of pixel containing a lowest tip of the letter 'T' in the word "The". The content detection module 116 may make a notation regarding a second vertical coordinate 418 of the location 416 on the digital image 400. The vertical coordinate 418 may indicate a vertical offset 420 of the location 416 from the top edge 414 of the digital image 400.

Subsequently, the content detection module 116 makes a processing pass 402(N) across the digital image 400 without detecting a color value that is different from the color value of the background of the digital image. Based on this information, the content detection module 116 may retrieve the vertical coordinate 410 and the vertical coordinate 418 as the vertical boundaries coordinates of the line 402. For example, the vertical coordinate 410 may have a value of 25 pixels from the top edge 408, and the vertical coordinate 418 may have a value of 35 pixels from the top edge 408. In such an example, the content detection module 116 may designate the section of the digital image that is vertically bounded by the vertical coordinate 410 and the vertical coordinate 418 as a content region.

In this manner, the content detection module 116 may continue to make a plurality of processing passes across the digital image 400, noting vertical coordinates of locations where color value changes occurred and designating one or more regions of digital image 400 as corresponding lines of text. For example, another processing pass may discover a color value change at the uppermost tip pixel of the letter "h" in the line "their mighty and all-powerful deity was on the top of", which corresponds to uppermost point of this particular line of content. Likewise, an additional processing pass may discover a color value change at the lowest tip pixel of the letter "y" in the line "their mighty and all-powerful deity was on the top of", which corresponds to the lowest point of this particular line of content. Accordingly, in such an example, the line detection module may designate a horizontal section whose upper vertical boundary defined by the uppermost tip pixel of the letter "h" and who lower vertical boundary is defined by the lowest tip pixel of the letter "y".

Once the content detection module 116 has made all the processing passes over the digital image 400, the content detection module 116 may divide the digital image 400 into alternating regions of content and background space. This form of alternating division is illustrated in FIG. 5.

Figure 5:
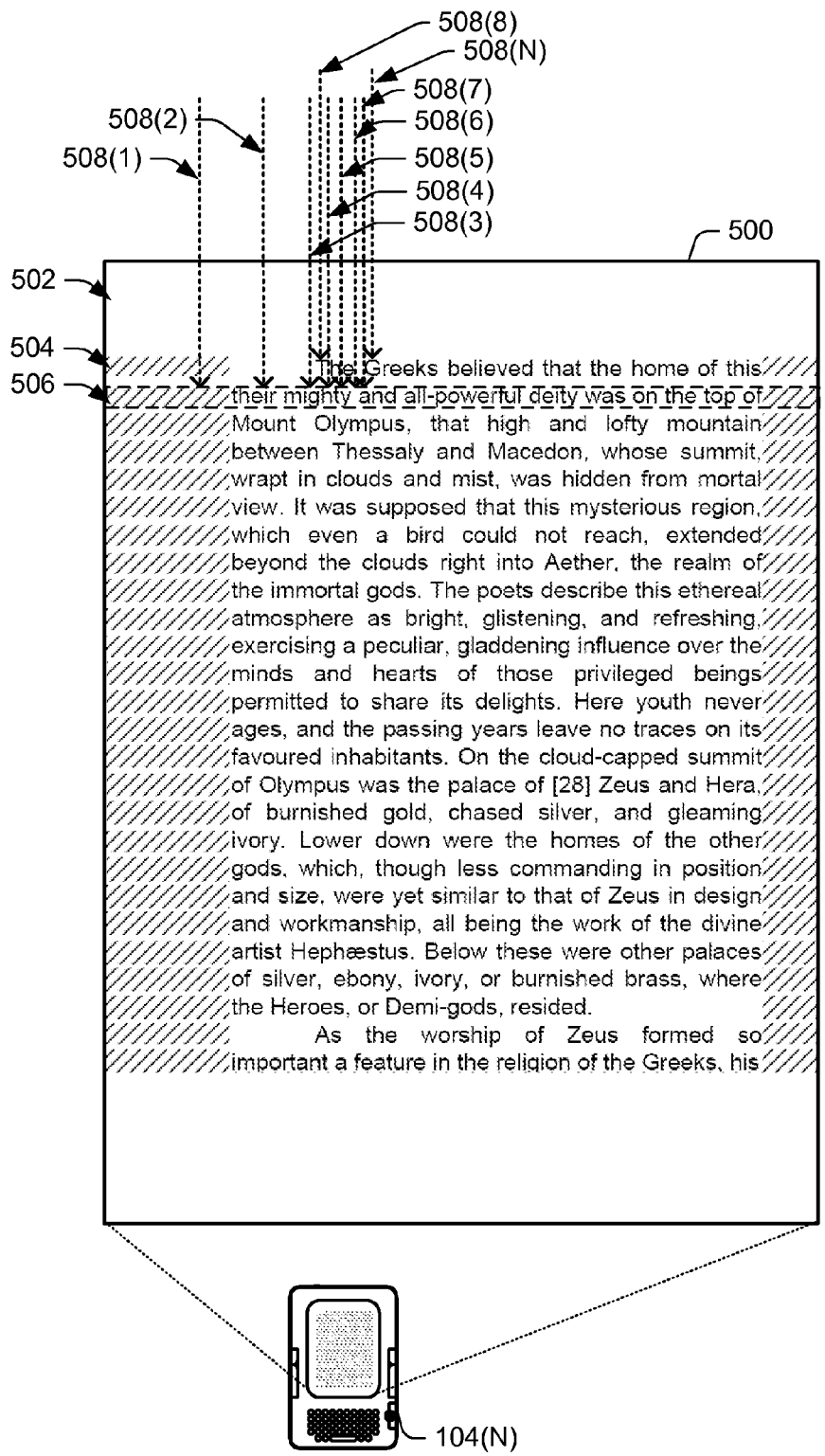
FIG. 5 illustrates an example division of a digital image into content regions and background regions, as well as the identification of word divisions.

FIG. 5 illustrates an example division of a digital image 500 into content regions and background regions by the content detection module 116. As shown in FIG. 5, regions that are not shown with hatching, such as region 502, may be portion of the digital image 500 that have been determined by the content detection module 116 as background, or non-content regions. In contrast, the hatched regions, such as the content regions 504 and 506 (extending from the left side of the digital image 500 to the right side), may be portions of the digital image 500 that have been determined by the content detection module 116 as containing content.

The content detection module 116 may further detect word divisions (e.g., spacing between words) for each content region, such as the content region 504, by performing word division processing passes for each content region. The word division processing passes may be performed for lines of pixels. Thus, the arrows that represent the word division processing passes 508(1)-508(N) are merely illustrative, and are not intended to represent every word division processing pass made by the content detection module 116. As shown, the word division processing passes may be performed in a direction that is perpendicular to the content region detection processing passes.

In various embodiments, the word divisions processing may be performed in substantially the same manner as the content region processing passes to detect pixel color values that are different from the background color value in each content region. During such processing passes, the content detection module 116 may record the locations (e.g., horizontal coordinates) in each content region where no pixel color change occurred from one edge of the content region to an opposite edge of the content region. For example, with respect to content region 504, such lack of pixel color change may be detected by processing passes 508(1)-508(7), while processing passes 508(8) and 508(N) may detect pixel color changes.

Subsequently, the content detection module 116 may determine the word divisions by analyzing the pixel color change data obtained by the word division processing passes. In various embodiments, the content detection module 116 may rule out lines of pixels where a color change from the background color value occurred, such as vertical lines of pixels that correspond to processing passes 508(8) and 508(N), as divisions between words. With respect to the remaining pixels, the content detection module 116 may designate a section of pixels having the background color as a word division when the number of consecutive lines of such pixels in the section exceeds a predetermined threshold.

For example, in English texts, the size of the spaces between words is generally greater than the spacing between letters that make up each individual word. Moreover, in some instances, while the size of the spaces between words is generally consistent through a digital image, the size of spaces between words may vary considerable due to typographic alignment techniques.

Thus, the content detection module 116 may use an appropriate cutoff threshold to determine the occurrence of word divisions in a digital image. For example, the content detection module 116 may designate a section of consecutive lines of background color pixels as a word division when the width of the section is greater than five pixels, or any other predefined range.

In other embodiments, the content detection module 116 may dynamically determine the word divisions. Specifically, the content detection module 116 may rule out a section of consecutive lines of background color pixels as a word division when the horizontal dimension of the section is the most frequently occurring horizontal pixel section dimension in a digital image. Accordingly, the content detection module 116 may designate the remaining consecutive pixel line sections as word divisions. Thus, as shown in FIG. 5, the content detection module 116 may detect word divisions, or space, between the "The Greeks", and the word division, or space, between "Greeks believed", and so on and so forth. Moreover, the content detection module 116 may also treat any margins or indentations having the background color value that is between an edge of the digital image and the content of the digital image 500 as word divisions. In this way, the content detection module 116 may obtain word divisions for each digital image of the digital image collection 108.

In additional embodiments, the content detection module 116 may also dynamically detect whether the text of the digital image 500 is divided into columns. In such embodiments, the content detection module 116 may detect that word divisions in a predetermined number of lines of text appears to have the same horizontal dimensions, and each of the word divisions starts at the same first horizontal coordinate and end at the same second horizontal coordinate (i.e., lined up vertically). Accordingly, the content detection module 116 may determine that such word divisions indicate that such lines of texts are divided into columns. In these embodiments, the predetermined number of lines of text may vary from two to a number that is equal to the lines of text that are present in the digital image 500.

It will be appreciated that the content detection module 116 may distinguish between the content regions and non-content regions, as well as detect word divisions and/or columns, by perform processing passes from a left-to-right direction or a right-to left direction. The illustrative processing passes performed by the line detection module are further described in FIG. 6.

FIG. 6 shows the illustrative processing directions employed during the processing for the content regions and non-content regions of a digital image 600. In some embodiments, the content detection module 116 may employ left-to-right content region processing passes 602, consistent with the previous description in FIG. 4. In one or more embodiments, the content detection module 116 may perform the content region processing passes 602 "line-by-line" while proceeding from the top of the digital image 600 to the bottom. In other embodiments, the content detection module 116 may also perform the content region processing passes 602 "line-by-line" while proceeding from the bottom of the digital image 600 to the top.

In some embodiments, the content detection module 116 may employ right-to-left content region processing passes 604. The content detection module 116 may perform the content region processing passes 604 "line-by-line" while proceeding from the top of the digital image 600 to the bottom. However, alternatively, the content detection module 116 may also perform the content region processing passes 604 "line-by-line" while proceeding from the bottom of the digital image 600 to the top.

In various embodiments, the content detection module 116 may conduct the content region processing passes 602 and 604 iteratively. For example, the content detection module 116 may perform a processing pass 602, then a processing pass 604, followed by another processing 602, and so on and so forth, as the content detection module 116 moves back and forth down the digital image 600. Moreover, the content detection module 116 may further perform word division processing passes in a direction that is perpendicular to the content region processing passes. Thus, the content detection module 116 may perform word division processing passes 606 and/or word division processing passes 608, as indicated in FIG. 6.

However, it will be appreciated that in some embodiments, a digital image may be preloaded with word division and/or column information. For example, such a digital image may be a specially formatted image. Alternatively, the content detection module 116 may have the ability to store word division and/or column information by associating such information with a digital image, such as storing such information as metadata embedded in the digital image. In this alternative scenario, the digital image may be an image that was previously processed by the content detection module 116. In such embodiments, the content detection module 116 may have the ability to extract such information from the digital image.

Digital Image Artifact Elimination

Figure 7:
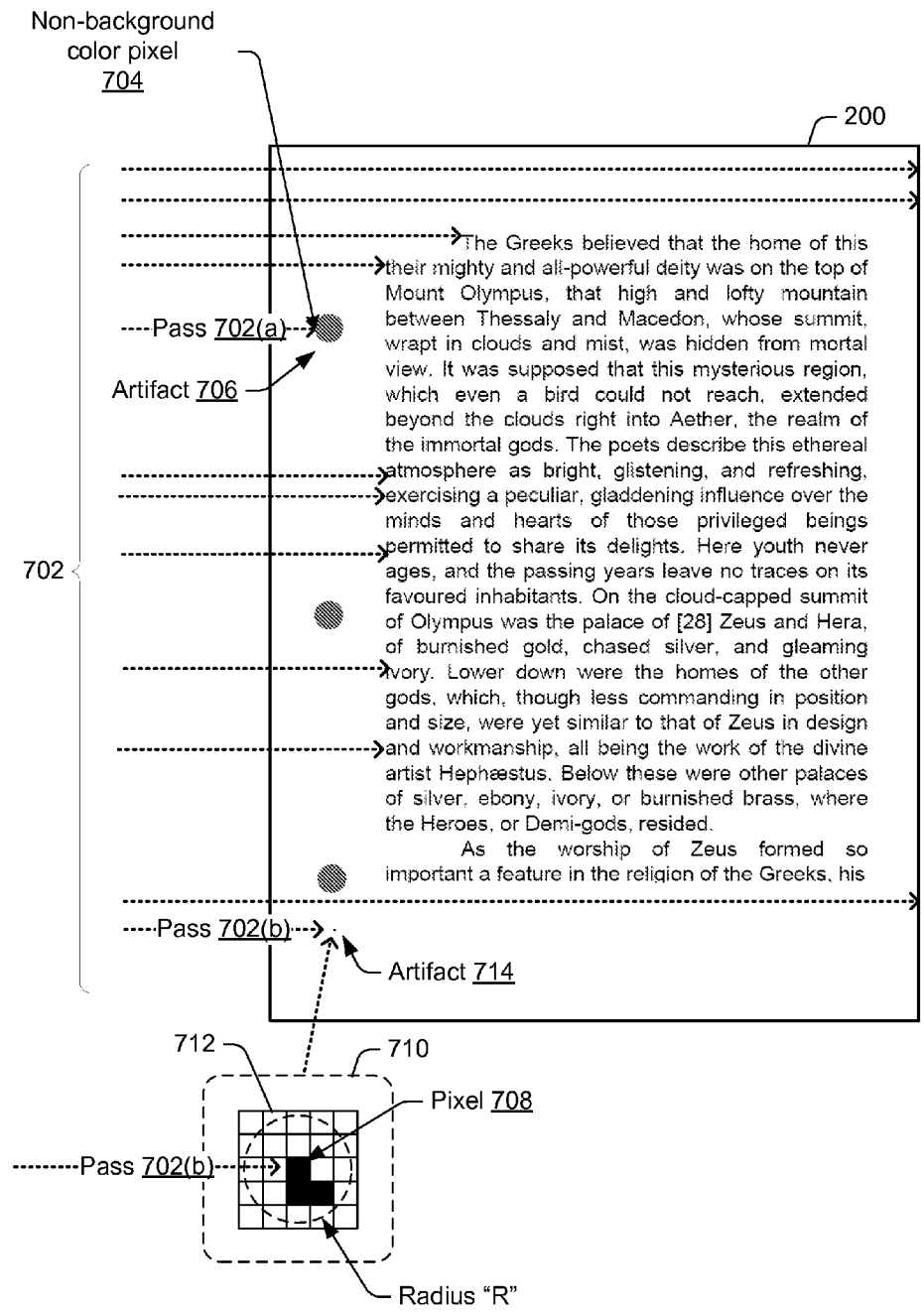
FIG. 7 shows an illustrative elimination of artifacts from a digital image during processing.

FIG. 7 shows illustrative detection and elimination of artifacts from a digital image by the content detection module 116 during the processing of the digital image. For example, the digital image may be the digital image 400 of FIG. 4. As shown, the content detection module 116 may attempt to ascertain the presence of the content regions. Accordingly, the content detection module 116 may make repeated content region processing passes across the image from the left side to the right side of the digital image 400, in which the processing passes may start at the top of the digital image 400, and proceed vertically down the digital image 400. As further described above with respect to FIG. 4, the content detection module 116 may determine a content region is reached when a pixel has a color value that is different from the color value of the background of the digital image 400.

However, in accordance with some embodiments, the content detection module 116 may perform a color validation check of pixels that have color values that are different from the color value of the background to ensure that the pixels truly represent content. In some embodiments, the content detection module 116 may perform the validation of the non-background color pixel based on the similarity in color between the non-background color pixel and a predominant non-background color of the digital image 400. Thus, in such embodiments, the content detection module 116 may have the ability to ascertain, based on the overall colors of the digital image 400, the most common non-background color present in the digital image 400, or the "dominant color value".

Returning to FIG. 7, the content detection module 116 may make a processing pass 702(*a*) that reaches a pixel 704 that has a non-background color value, or "candidate color value". At this time, the content detection module 116 may determine whether the candidate color value of the pixel 704 matches the dominant color value. If the candidate color value matches the dominant color value, then the content detection module 116 may determine that the pixel 704 is part of the content. However, if the content detection module 16 determines that the candidate color value of the pixel 704 does not match the dominant color value, the content detection module 116 may determine that the pixel 704 is part of an artifact 706 and should be skipped. Accordingly, the processing pass 702(*a*) may proceed to the next pixel and perform the same validation test.

Alternatively, the content detection module 116 may accept a pixel as part of the content if its candidate color value is within a predetermined deviation range from the dominant color value. For instance, the predetermined deviation range may be up to 10% hue deviation. Thus, if the candidate color value of a pixel, such as the pixel 704, is a grayscale color whose color value is within 10% hue deviation from the dominant color value, the content detection module 116 may determine that the pixel 704 is part of the content that is on the digital image 400. Nevertheless, it will be appreciated that the predetermined deviation range may be any range that serves to accommodate some natural variability with respect to the color of the content yet effectively distinguishes the content of the digital image 400 from artifacts, such as the artifact 706.

In alternative embodiments, the content detection module 116 may perform a density check for each pixel that has a non-background color to ensure that each pixel is part of the content on the digital image 400. For example, as shown, the content detection module 116 may make a processing pass 702(*b*) that reaches a pixel 708 that has a non-background color (as shown in expanded view 710). Having reached the pixel 708, the content detection module 116 may examine the color values of pixels 712 that falls within a predetermined proximity, such as within a radius "R" of the pixel 708. For example, the predetermined radius "R" may be two pixels in at least one embodiment. However, any other number of pixels may serve as the predetermined radius.

In such embodiments, the content detection module 116 may determine that the pixel 708 is part of an artifact, such as an artifact 714, if the pixels 712 do not include a predetermined percentage/number of non-background color pixels having the same color as the pixel 708. For example, in at least one embodiment, the content detection module 116 may determine the pixel 708 is part of an artifact 712 if the pixels 710 do not include at least 50% identically or similarly colored pixels. Nevertheless, the predetermined percentage/number of non-background color pixels (e.g., pixels 712) having the same color as the pixel being examined (e.g., pixel 708) may vary in other embodiments.

In further embodiments, the content detection module 116 may determine that a pixel is part of the content of the digital image 400 if the pixel passes both tests. In other words, the pixel is deemed to be part of the content if it (1) has a candidate color value that matches or is within a predetermined deviation of a dominant color value; and (2) is surrounded by a predetermined percentage/number of identically or similarly colored pixels. Further, it will be appreciated that although the color validation and the density check test for identifying pixels as either content or artifacts are described in FIG. 7 with respect to processing passes that are from left-to-right, such color validation and density check tests may also be applied by the content detection module 116 for other processing directions.

The content detection module 116 may also eliminate headers and footers that are present on digital images. In at least one embodiment, the content detection module 116 may eliminate a group of non-background color pixels that are (1) within a predetermined distance (e.g., 20 pixels) from an edge of the digital image; and/or (2) more than an average distance from the other non-background color pixels. In other embodiments, the content detection module 116 may also eliminate a group of non-background color pixels that appear in identical locations on a predetermined number of digital images of a digital image collection, such as the digital image collection 108. In such embodiments, the predetermined number may vary from two up to the number of digital images in the digital image collection.

Digital Image Content Portion Expansion

The content expansion module 118 may divide each content region, such as content region 504 of the digital image 500, into content portions. In some instances, the content expansion module 118 may divide each content region into a plurality of content portions according to the requested magnification factor and a horizontal width of the digital image 500. The division of a content region into content portion is illustrated in FIG. 8.

Figure 8:
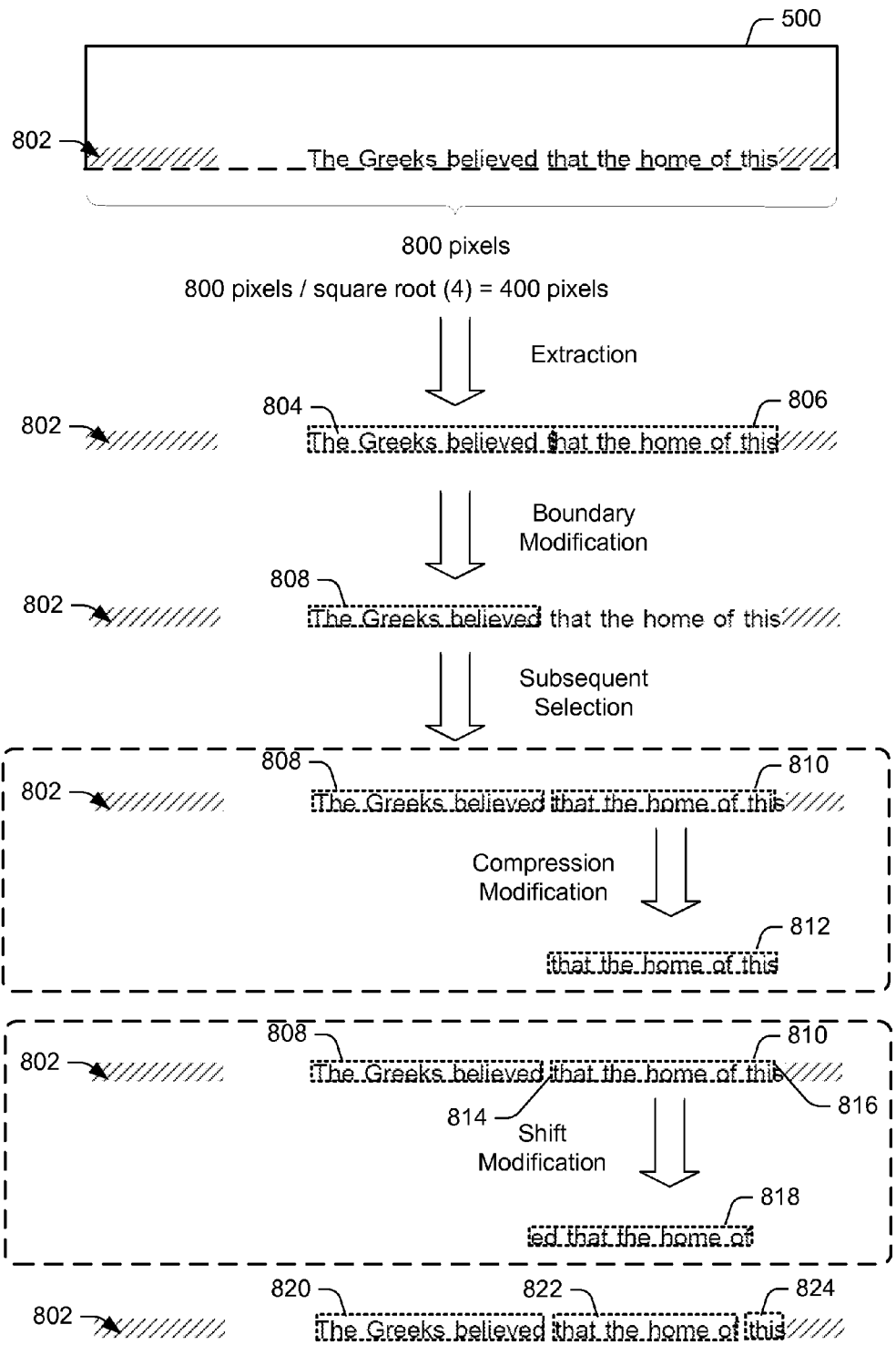
FIG. 8 illustrates the division of a content region in a digital image into individual content portions for display.

FIG. 8 illustrates the division of a content region in a digital image 500 into content portions based on a requested magnification factor for presentation on a display of an electronic device 104. For the purpose of clarity, only a top portion of the digital image 500 is illustrated in FIG. 8. The top portion of the digital image 500 is illustrated as including a content region 802, running from the left side of the digital image to the right side.

As shown, the content expansion module 118 may initially derive a horizontal width of the digital image 500. The content expansion module 118 may further divide the horizontal width by a square root of the magnification factor for the digital image 500 to derive a width of each content portion that is to be expanded and displayed. The content expansion module 118 may then use the derived width to encapsulate a content portion from a content region. In at least one embodiment, the derived width and the pre-existing height of the content portion may then be further multiplied by the square root of the magnification factor to achieve the magnification of the encapsulated content portion for presentation on a display. The pre-existing height of a content portion may be demarcated by non-content regions that surround the content portion (e.g., line spacing above and below a line of text content).

In an example, when the horizontal width of the digital image 500 is 800 pixels wide and the desired magnification factor is four, the content expansion module 118 may perform the following calculation: 800 pixels wide/$\sqrt{4}$=400 pixels. Thus, in such an example, 400 pixels may be the horizontal width of each content portion that is to be expanded for presentation on a display of an electronic device 104. Accordingly, the content expansion module 118 may identify a content portion 804 from the content region 802 that is 400 pixels in width. The content expansion module 118 may then expand the content in the content portion, as well as the digital image that includes the content portion, by a factor of 4, so that each of the width and height of the content portion 804 is doubled, to achieve a 4× magnification. In other words, the 400 pixel width of the content portion 804 may be doubled to 800 pixels, accompanied by corresponding magnification of its content, so that the content portion 804 may horizontally fill the width of the display of the electronic device 104. Furthermore, assuming that the height of the content region 804 is 20 pixels, the height of the content region may be double to 40 pixels.

In some embodiments, the content expansion module 118 may further adjust the derived content portion width prior to encapsulating each content region into content portions. For instance, the content expansion module 118 may shorten the derived content portion width slightly prior to expansion to provide some bordering around each content portion as they are displayed. In such embodiments, the derived content portion width may be shortened or lengthened by up to a predetermined percentage. In one example, such predetermined percentage may be up to 10%.

Once the content portion 804, as well as the digital image that includes the content portion 804, is properly expanded for display. In this way, the content expansion module 118 may proceed to identify and expand an adjacent content portion, such as the content portion 806, from the content region 802, in a substantially same manner. Further, the content expansion module 118 may also apply the same technique to sequentially identify and expand additional content portions from other content regions of the digital image 500.

It will be appreciated that the processing performed by the content expansion module 118 of the content regions in the digital image 500 to successive content portions may be based on direction and flow of the writing convention associated with the digital image content (e.g., left-to-right writing, proceeding from the top to the bottom of the digital image). Moreover, in embodiments where the content detection module 116 has detected columns of content in a digital image, the content expansion module 118 may process the columns sequentially according to the same writing convention.

In various embodiments, the content expansion module 118 may perform a sequential identification and magnification of a subsequent content portion in response to the activation of the forward control 306 of an electronic device 104. Similarly, the content expansion module 118 may perform a sequential identification and magnification of a preceding content portion in response to the activation of the back control 304 of the electronic device 104. Further, it will be appreciated that since the content expansion module 118 may perform the identification and magnification of each content portion based in part on the magnification factor, the content expansion module 118 may dynamically adjust the widths of the displayed content portions based on changes in the user selected magnification factor. Moreover, the adjustment of the widths of the content portions may correspondingly increase or decrease the size of the digital image (e.g., text, a portion of an image, etc.) that is displayed in each content portion.

In at least one embodiment, the content expansion module 118 may further adjust the width of a content portion that is to be expanded and displayed to exclude extraneous content. As described above, the width of each content portion may be derived based on a user selected magnification factor. In this way, the application of the corresponding magnification factor may maximize the display of the content portion on a display of an electronic device 104. However, the designation of a content portion based on a derived content portion width may result in a content portion that includes one or more partial letters from a word. For example, as shown in FIG. 8, the designated content portion 804 may actually read as "The Greeks believed t", where the orphaned and extraneous 't' is from the subsequent word "that".

In such a scenario, the content expansion module 118 may use the word division information, as previously obtained by the content detection module 116, to ensure that each content portion is free from such extraneous characters.

For example, with respect to the content region 500, the content detection module 116 may have previously determined that a word division exists between the words "believe" and "that". Thus, following the selection of content region 804, the content expansion module 118 may use such word division information to move the right boundary of the content portion 804 so that the portion no longer includes the letter "t" or its preceding word division, i.e., space. The resultant content portion is illustrated in FIG. 8 as modified content portion 808. Subsequently, the content expansion module 118 may designate a subsequent content portion 810. It will be appreciated that in designating the subsequent content portion 810, the content expansion module 118 may exclude the word division, i.e., space, that precedes the word "that".

In additional embodiments, the content expansion module 118 may compress additional content into a designated content portion, such as remaining content of a content region having a width that less than a predetermined threshold. For example, as shown in FIG. 8, the selection of the sequent content portion 810 by the content expansion module 118 may leave a partial "s" at the end of the content region 802. Accordingly, the content expansion module 118 may compress the content in the designated content portion 810 so that the remaining content (e.g., partial "s") may be included in the content portion 810, thereby creating compressed content portion 812. In this way, the content expansion module 118 may alleviate the need to designate a small content portion, such as a small portion to accommodate the partial "s" for display.

In some instances, the content expansion module 118 may determine that a content portion may be compressed to accommodate a remaining portion of the content region if the remaining portion has a width (in pixels) that is less than a percentage (e.g., 5%) of the width of the content portion. In other instances, the content expansion module 118 may determine that a content portion may be compressed to accommodate a remaining portion of the content region 802 if the remaining portion has a width (in pixels) that is less than predetermined pixel threshold (e.g., less than 10 pixels in width). Otherwise, the content expansion module 118 may encapsulate the remaining content of the content region into a content portion that has a width that is less than the width derived based at least on the magnification factor. For example, as shown in FIG. 8, the content expansion module 118 may create such irregular sized content portion 824 to encapsulate the remaining content after the other content of the content region 802 have been encapsulated in content portions 820 and 822. The irregular sized content portion 824 may then be centered horizontally or substantially horizontally on a display of the electronic device 104.

In further embodiments, rather than compressing additional content into a designated content portion, the content expansion module 118 may shift the content portion to exclude a partial word at the end of the content portion, that is, an ending partial word. In this way, the shifted content portion may show a portion of the content from the preceding content portion, and a lagging boundary of the content portion may be shifted to terminate at a word division prior to the ending partial word. For example, the content expansion module 118 may shift the content portion 810, which contains the content "that the home thi" to partially show a portion of the previous content portion 808. In other words, the leading boundary 814 of the content portion 810 may be shifted to partially overlap the content of the content portion 808, i.e., "ed". Further, the lagging boundary 816 of the content portion 810 may be shifted to terminate at the word division after the word "of". Accordingly, the content portion 810 may be transformed into a shifted content portion 818 that contains the content "ed that the home of". Subsequently, the content expansion module 118 may designate an irregular sized content region 824 to encapsulate the remaining content portion 824.

In some instances, the content expansion module 118 may determine that a content portion may be shifted to exclude the ending partial word if the ending partial word in the content portion has a width (in pixels) that is less than a percentage (e.g., 25%) of the width of the content portion. In other instances, the content expansion module 118 may determine that a content portion may be shifted to exclude the ending partial word if the remaining portion has a width (in pixels) that is less than predetermined pixel threshold (e.g., less than 50 pixels in width).

Referring back to FIG. 5, the content expansion module 118 may use other techniques to convert each content region into content portions. In some embodiments, the content expansions module 118 may use a predetermined width value to convert each content region of a digital image 500 into content portions. For example, the content expansion module 118 may sequentially select content portions of a digital image 500 that are 200 pixels in width for expanded display. Thus, during subsequent display, assume that the designated content portions are to be presented on a display that is 800 pixels in width, the content expansion module 118 may expanded each designated content portion until its width is 800 pixels, or occupies the entire width of the display. In such embodiments, the content expansion module 118 may apply content portion boundary modification to prevent inclusion of extraneous content in a content portion. Further, the content expansion module 118 may also apply content compression or the use of irregular content portion width, as described above, to deal with content that remains at the end of each content region. Moreover, the content expansion module 118 may also use word divisions to exclude extraneous content from each content portion.

In additional embodiments, the content expansion module 118 may use a content width value that is proportional to a width or height of a display of an electronic device 104. For example, assume that the width of the display is 1000 pixels. In such an example, the content expansion module 118 may sequentially select content portions of a digital image 500 that are 250 pixels in width, or ¼ of the total display width, for expanded display. Thus, during subsequent display, the content expansion module 118 may expanded each designated content portion until its width is 1000 pixels, or occupies the entire width of the display. In such embodiments, the content expansion module 118 may apply content portion boundary modification or content compression, as described above, to deal with content that remains at the end of each content region. Moreover, the content expansion module 118 may also use word divisions to exclude extraneous content from each content portion.

It will be appreciated that the magnification of the content portions have been described above as implemented to horizontally fill the entire width of a display, magnification of the content portions may be implemented to any degree up to full horizontal occupation of the width of the display. For example, a content portion may be expanded up to a point that some blank spaces still remain at the left and right of the content portion for aesthetic purposes.

Moreover, while the various techniques shown in FIG. 8 are described above with respect to the modification of a content portion (e.g., adjusting the width, compression, shifting, etc.), it is understood that such modification are actually implemented by the content expansion module 118 as the appropriate modification of the entire digital image that includes the content portion. For example, the compression of the content portion 810 is, in actual terms, the compression of the digital image 500 that includes the content portion 810 so that the content portion 810 may be presented on a display of an electronic device 104 as the transformed content portion 812. Likewise, the movement or shifting of a boundary of a content portion, such as the generation of the transformed content 818, may be implemented by the content expansion module 118 as the movement or shifting of the digital image 500 with respect to the display of an electronic device 104 so that the portion of the digital image 500 that is visible on the display is changed.

Figure 9:
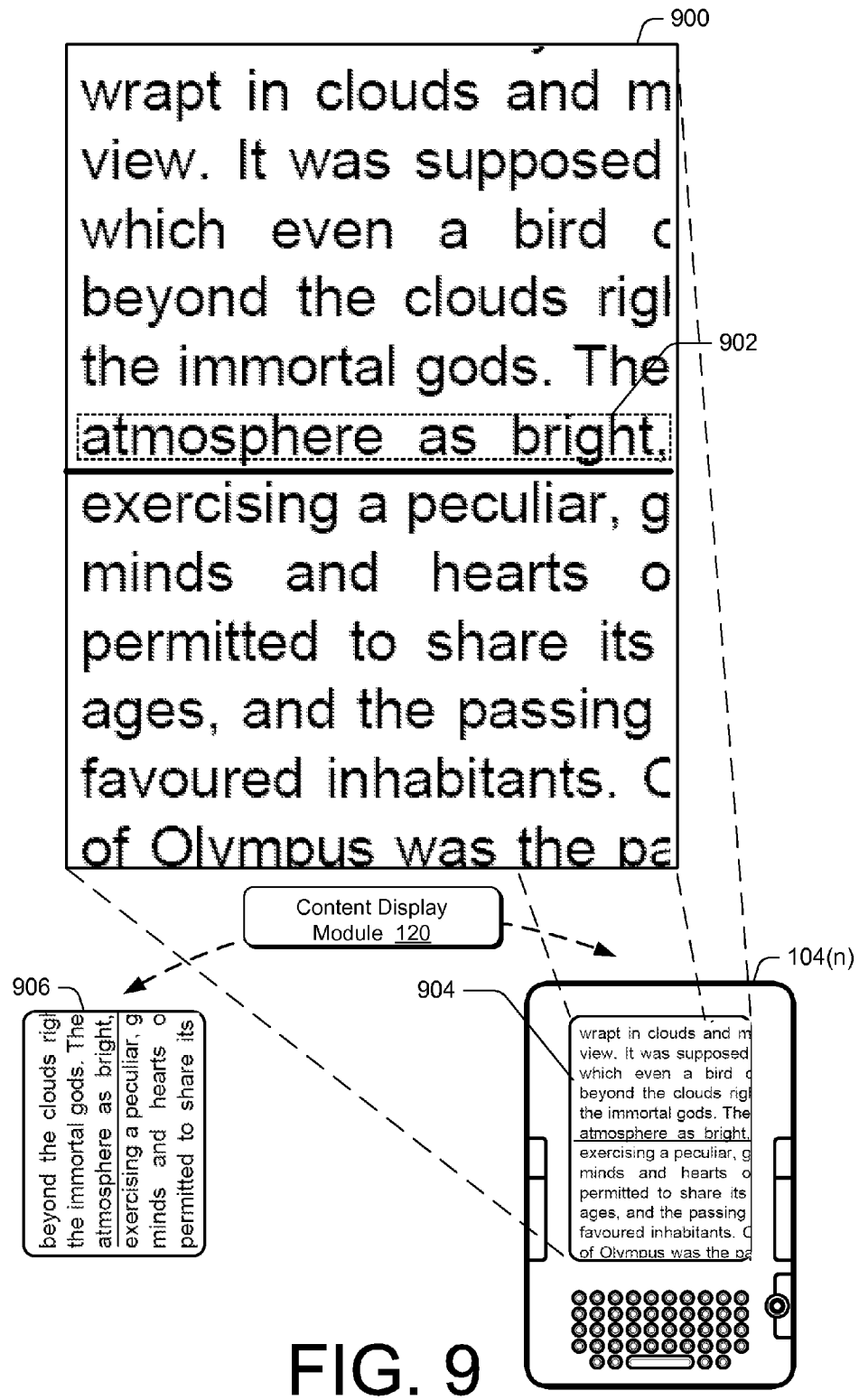
FIG. 9 shows illustrative display of an expanded content portion of a digital image with the inclusion of context indicators.

FIG. 9 shows illustrative display of the expanded content portion 902 of a digital image 900 with the inclusion of context indicators intended to give the user of the digital image context as to where in the digital image 900 the user is currently located. As shown, the content expansion module 118 may display context indicators to show the relation of a content portion, such as the content portion 902, with other content of the digital image 900.

In various embodiments, the content expansion module 118 may designate the content portion 902 for presentation on a display of an electronic device, such as an eBook reader device 104(N). Additionally, the content expansion module 118 may provide a visual indicator to distinguish the original content of the content portion 902 from the surrounding content of the digital image 900. In at least one embodiment, the visual indicator may be in the form of an underline that marks the original content of the content portion 902. However, the visual indicator may also take other forms in other embodiments, such as arrow marks, a surrounding rectangle, and/or the like. In additional embodiments where the display of the electronic display is a color display, the visual indicator may be in the form of different colors. For example, black may be used for the original text of the content portion 902, while blue may be used for the remaining context content.

The content display module 120 may be configured to display each content portion, as well as the corresponding digital image, that is designated and expanded by the content expansion module 118. The content display module 120 may be activated via user controls, e.g., the back control 304 and the forward control 306. In some embodiments, the content display module 120 may be activated via the user controls to reorient a designated content portion prior to display. For example, as shown in the example display 904, the original designated content portion 902 may be expanded for display along a horizontal orientation. However, as shown in example display 906, the content display module 120 may reorient the designated content portion 902 for display along a vertical orientation.

Once activated, the content display module 120 may cause the display of the electronic device 104 to pan to an expanded content portion, such as the content portion 902. In other words, while the original digital image 900 may fit within the display of the electronic device 104, the expanded digital image 900 may be significant larger (e.g. four times larger) than the area of the display. Accordingly, the content display module 120 may pan the expanded digital image 900 with respect to the display of the electronic device so that the content portion 902 is displayed in a central location (e.g., vertically centered or substantially vertically centered) in the display. Thus, at least a portion of the content on the digital image 900 may become invisible, i.e., moved off of the display of the electronic device. Subsequently, another activation display module 120 may replace the content portion 902 with a preceding or subsequent expanded content portion that is displayed in a similar manner as the content portion 902.

In some embodiments, the content display module 120 may further expand the designated content portion by expanding the digital image that includes the designated content portion, so that the designated content portion is maximally displayed in the new orientation. For example, the content portion 902 (as well as the surrounding content of digital image 900), may be expanded for presentation in a horizontal orientation on a display of the electronic device 104. Thus, assuming that the ratio between the horizontal width and the vertical height of the display 904 is 1:1.5, the content display module 120 may further expand the content portion 902 (and surrounding content of the digital image 900) by a factor of 1.5 vertically prior to presentation on the display. In other embodiments, rather than expanding the designated content portion, the content display module 120 may take advantage of any additional display space provided by a difference in dimension between the width and height of the display 904 to present additional content that provides context to the designated content portion.

Other Electronic Device Modules

Returning to FIG. 1, the user interface module 122 may receive input from various user controls on an electronic device 104, such as the back control 304 and the forward control 306. As described above, the user controls may include, but are not limited to, combinations of one or more of keypads, keyboards, mouse devices, touch screens, microphones, speech recognition packages, and any other suitable devices or other electronic/software selection methods. Further, the user interface module 122 may also provide data to the user via the display of the electronic device 104.

The user interface module 122, in conjunction with user controls on the electronic device 104, may enable a user to enter and exit the sequential digital image panning mode. Additionally, once in the sequential digital image panning mode, the user interface module 122 may enable a user to sequentially pan through the expanded content portions in a digital image, such as the digital image 400. Thus, through the use of various user controls and the user interface module 122, the user may sequentially pan forward or backward through the content portions of the digital image collection 108.

In some embodiments, the user interface module 122 may further interact with user controls that enable a user to determine the degree of magnification for the content portions, as well the orientation for display of the content portions. The user interface module 122 may also enable a user to determine the way that content portions are to be identified from a content region, such as based on a image width, a magnification factor, a predetermined content portion width, or a width of a display that presents the digital image.

The data cache module 124 may store data that enables the usage of the sequential digital image panning mode. Such data may include the locations of content regions, content portions, as well as word division in each digital image. The data may further include the width of the each digital image, the desired magnification factor for each digital image, the desired context and content indicators, the desired display orientation for the designated content portions. Moreover, the data cache module 124 may also store any additional data that enable the various modules on the electronic device 104 to dynamically and sequentially display the content portions in the sequential electronic panning mode. In some embodiments, the data cache module 124 may also provide the content region designation, content portion designations, and/or word division data for each of the digital images to the server 102 via the network 106.

In some embodiments, the data cache module 124 may also buffer previously identified and/or expanded content portions. For instance, the data cache module 124 may buffer a predetermined number of content portions (e.g., 15 content portions) that were displayed prior to the currently displayed content. Thus, when a user desires to review a previously displayed content portion, the data cache module 124 may directly provide the desired content portion to the content display module 120 without repeating the performance of certain operations.

Digital Image Server Modules

The server 102 may include one or more processors 126 and a storage media 128, which includes an operating system 130, as well as other modules. The modules may include routines, programs, objects, components, and data structures that cause the server 102 to perform particular tasks. The modules may include a data storage module 132 and a data distribution module 134.

The operating system 130 may perform various function that enables the server 102 to receive and transmit data via various inputs (e.g., user controls, network interfaces, memory devices), process the data using the one or more processors 110 to generate output, and present the output (e.g., display the data on an electronic display, store the data in memory, or transmit the data to another electronic device). Accordingly, the operating system 130 may include various program components for performing such tasks.

The data storage module 132 may store digital images, such as images of the digital image collection 108. In some embodiments, the data storage module 132 may further store content region and word division information for one or more of the digital image collection 108, when such information is received from the data cache module 124 of an electronic device. Moreover, in instances where content regions in a digital image are divided according to a predetermined content portion width, the data storage module 132 may also store the content portion designation information for the digital image. Further, in some instances, the data storage module 132 may store the content region, content portion division, and/or word division information for a digital image as metadata that is embedded in the digital image.

The data distribution module 134 may provide the one or more digital images to one or more electronic devices 104. However, in some embodiments, the data distribution module 134 may also distribute digital images that are embedded with content region, content portion division, and/or word division information. Thus, the display of digital images in sequential digital image panning mode on an electronic device 104 may be enhanced the content detection module 116 of the electronic device 104 and may skip the performance of some of the operations.

In additional embodiments, the server 102 may also include one or more of the modules (e.g., modules 116-118 and 124) described with respect to an electronic device 104. In such embodiments, the server 102 may also perform the various content region identification, as well as content portion designation and expansion functions performed by each electronic device 104 for digital images. In such embodiments, the activation of user controls on a electronic device 104 for the purpose of sequential digital image panning of a digital image may be passed on to the server 102. In turn, the server 102 may perform the content portion identification and expansion, or retrieve an existing expanded content portion from a buffer. Subsequently, the server 102 may then pass the expanded content portion back to the electronic device 104. In response, the electronic device 104 may use its content display module 120 to reorient and/or present the expanded content portion on its display.

Illustrative Operations

Figure 10:
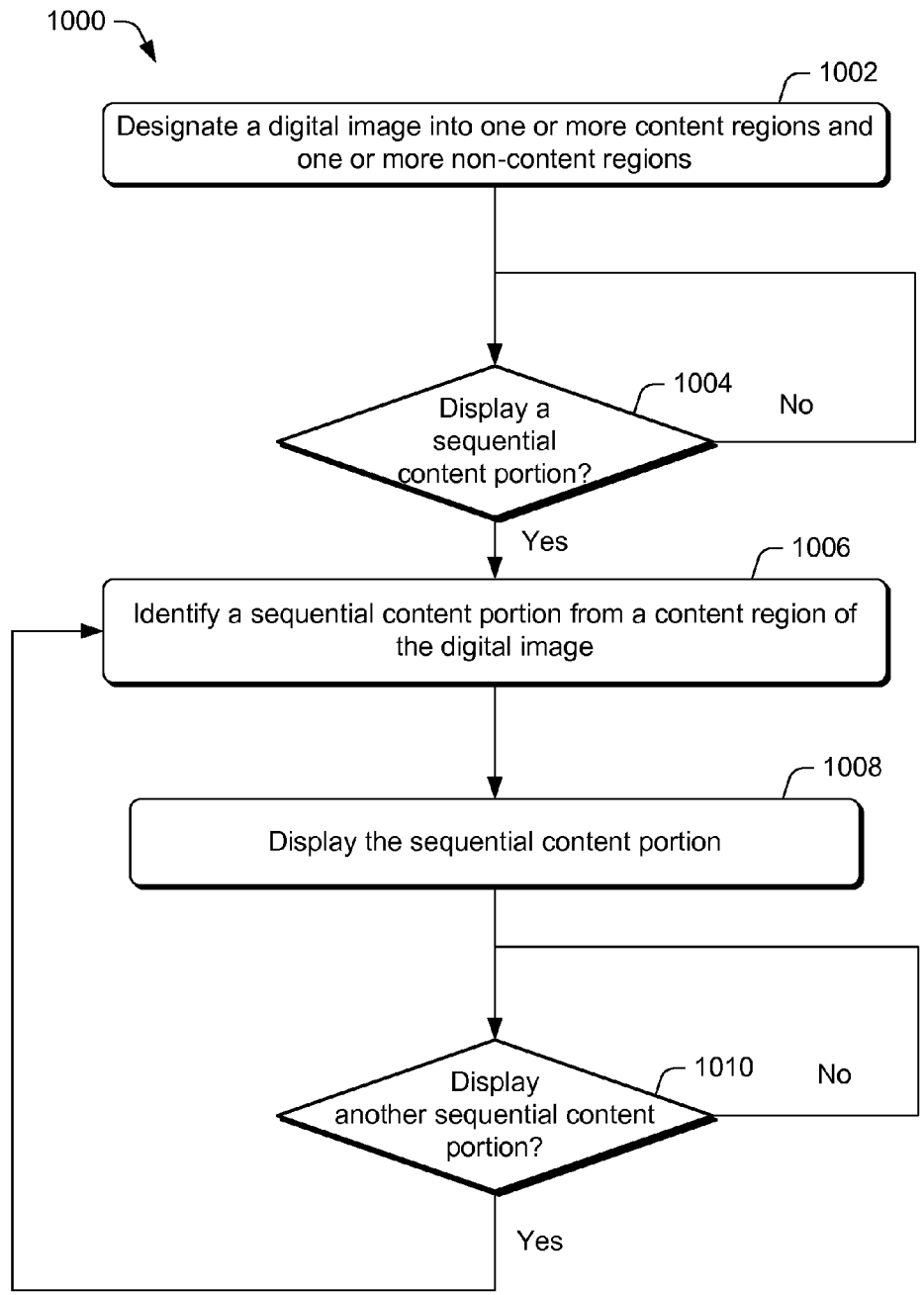
FIG. 10 is a flow diagram of an illustrative process for displaying expanded content portions of a digital image.
Figure 11:
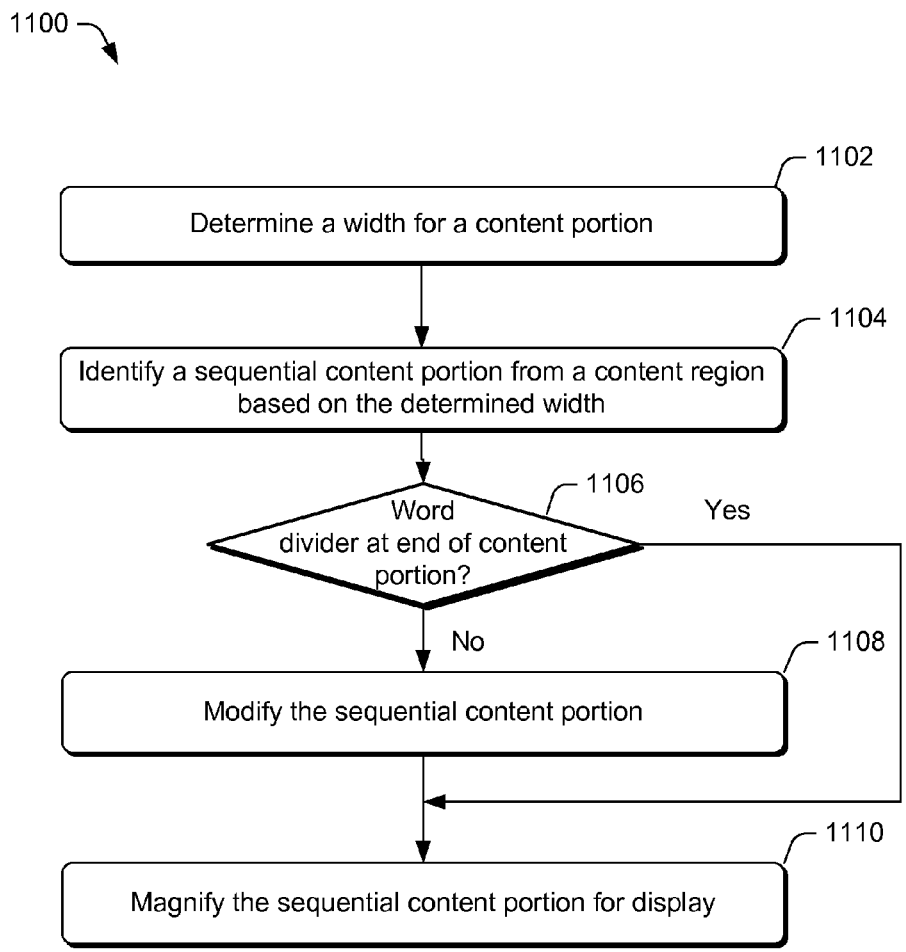
FIG. 11 is a flow diagram of an illustrative process for identifying contention portions from the content regions of a digital image.
Figure 12:
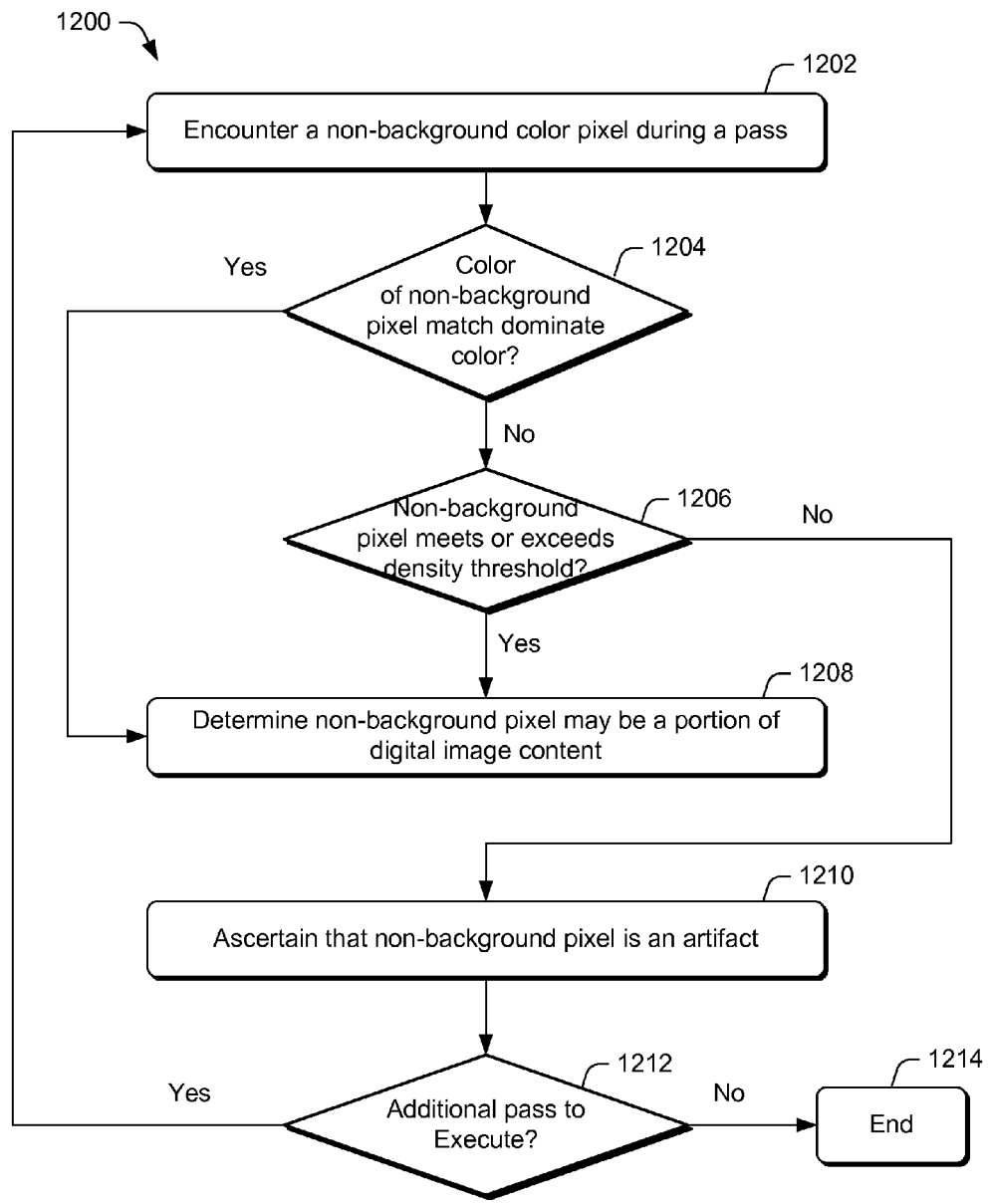
FIG. 12 is a flow diagram of an illustrative process for eliminating artifacts from a digital image during the processing of a digital image to determine a length of a margin on the digital image.

FIG. 10 to FIG. 12 show illustrative processes 1000-1200 for displaying a digital image in the sequential digital image panning mode. Each of the processes 1000-1200 is illustrated as a collection of blocks in a logical flow graph, which represents a sequence of operations that can be implemented in hardware, software, or a combination thereof. In the context of software, the blocks represent computer-executable instructions that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described blocks can be combined in any order and/or in parallel to implement the process. For discussion purposes, the processes 1000-1200 are described with reference to the environment 100 of FIG. 1.

FIG. 10 is a flow diagram of an illustrative process 1000 for displaying expanded content portions of a digital image. At block 1002, the content detection module 116 may detect and designate one or more portions of a digital image as a content region and one or more portions of the digital image as a non-content content region so that the regions are separated. For instance, the content detection module 116 may determine which portions of a digital image comprise a region of text and which portions are simply white spaces. In various embodiments, the content detection module 116 may distinguish the different regions via difference in color values in pixels, such as by comparing a dominant background color value versus non-dominant color values. Further, the content detection module 116 may detect and remove artifacts during the detection of the content regions.

At decision block 1004, the content expansion module 118 may determine whether a request to display a sequential content portion is received. In various embodiments, the content expansion module 118 may receive the request via user controls, such as back control 304 or forward control 306. If the content expansion module 118 determines that no request is received ("no" at decision block 1004), the process 1000 may loop back to repeat decision block 1004 so that the content expansion module 118 may monitor for additional requests. However, if the content expansion module 118 determines that there is a request to display a sequential content portion, the process 1000 may proceed to block 1006.

At block 1006, the content expansion module 118 may identify a sequential content portion. The content portion may be identified from a content region that is in the digital image. In various embodiments, the width of the content portion identified by the content expansion module 118 may be based on a digital image width and magnification factor, based on a predetermined content portion width, and/or based on the width of a display that presents the digital image.

During the identification of the content portion, the content expansion module 118 may modify a content portion boundary to prevent inclusion of extraneous content in a content portion. Further, the content expansion module 118 may also apply content compression or the use of irregular content portion width, as described above, to deal with content that remains at the end of each content region. The content expansion module 118 may then expand the digital image that includes the content portion. In some embodiments, depending on the user-selected setting, the content expansion module 118 may further provide the identified content portion with visual indicators to supply contextual information.

At block 1008, the content display module 120 may present the identified content portion, and at least a portion of the digital image that includes the content portion, on a display of an electronic device 104. In various embodiments, the presentation may include displaying the content portion in a central location (e.g., vertically centered or substantially vertically centered) in the display along with at least a portion of the adjacent content of the digital image. In some embodiments, the content display module 120 may further reorient the identified content portion and/or resize the identified content portion.

At decision block 1010, the content expansion module 118 may determine whether another request to display a sequential content portion is received. If the content expansion module 118 determines that another request is received ("yes" at decision block 1010), the process 1000 may loop back to block 1006, where another content portion that is sequential to the previous content portion may be identified in a similar manner. In various embodiments, the newly identified content portion may be immediately preceding or subsequent to the previously identified content portion, as dictated by the activation of either the back control 304 or the forward control 306.

However, if the content expansion module 118 determines that no request is received ("no" at decision block 1010), the process 1000 may loop back and the content expansion module 118 may repeat decision block 1010 to monitor for additional requests.

FIG. 11 is a flow diagram of an illustrative process 1100 for identifying content portions from the content regions of a digital image. The process 1100 may further illustrate the block 1006 of the process 1000.

At block 1102, the content expansion module 118 may determine a width for a content portion to be identified. In some embodiments, the width may be based on a width of the digital image that includes the content portion and a magnification factor selected by a user. In other embodiments, the width may be based on a predetermined value, such as a value selected by the user. In additional embodiments, the width may be proportional to the width of a display of an electronic device 104. At block 1104, the content expansion module may identify a sequential content portion from a content region based on the determined width.

At decision block 1106, the content expansion module 118 may determine whether the identified content portion ends at a word division (e.g., space). If the content expansion module 118 determines that identified content portion does not end at a word division ("no" at decision block 1106), the process 1100 may proceed to block 1108.

At block 1108, the content expansion module 118 may modify the identified content portion. In at least one embodiment, the content expansion module 118 may move the boundary of the content portion (e.g., shorten the width of the content portion) to a preceding word division. The shift of the boundary may exclude extraneous content (e.g., orphaned letters of a word) from the content portion. In other embodiments where the content portion is near the end of a content region, the content expansion module 118 may use content compression to include remaining content into the content portion. However, when the remaining content is wider than a predetermined threshold, the content expansion module 118 may designate an irregular content portion to encapsulate the content in a subsequent content portion.

At block 1110, the content expansion module 118 may expand the digital image that includes the identified content portion for presentation on a display of the electronic device 104. Returning to decision block 1106, if the content expansion module 118 determines that the identified content portion ends at a word division ("yes" at decision block 1106), the process 1100 may proceed directly to block 1110.

FIG. 12 is a flow diagram of an illustrative process 1200 for eliminating artifacts from a digital image during the processing of a digital image to determine a length of a margin on the digital image.

At block 1202, the content detection module 116 of an electronic device 104, such as the eBook reader device 104 (N), may encounter a non-background color pixel during a processing pass. At decision block 1204, the content detection module 116 may determine whether the color of non-background pixel (i.e., candidate color) matches or is within a predetermined deviation range of the dominant color of the digital image. If the content detection module 116 determines that the color of the non-background pixel matches or is within a deviation range ("yes" at decision block 1204), the process 1200 may proceed to block 1206. At block 1206, the content detection module 116 may determine that the non-background pixel may be a possible edge of the content in the digital image.

However, if the content detection module 116 determine determines that the color of the non-background pixel (e.g., pixel 704), does not match or is not within a deviation range ("no" at decision block 1204), the process 1200 may proceed to block 1208.

At block 1208, the content detection module 116 may determine whether the non-background pixel (e.g., pixel 708) meets or exceeds a density threshold. In other words, the content detection module 116 may determine whether there are sufficient numbers of non-background pixels within a predetermined proximity (e.g., radius) of the non-background pixel. If the content detection module 116 determines that the non-background pixel meets or exceeds the density threshold ("yes" at block 1208), the process 1200 may proceed to block 1206. At block 1206, the content detection module 116 may determine that the non-background pixel may be a portion of digital image content.

However, if the content detection module 116 determines that the background pixel does not meet the density threshold ("no" at block 1208), the process 1200 may proceed to block 1210. At block 1210, the content detection module 116 may determine that the non-background pixel is an artifact.

At decision block 1212, the content detection module 116 may determine whether there is an additional processing pass to execute. If the content detection module 116 determines that there is an additional processing pass to execute ("yes" at decision block 1212), the process 1200 may loop back to block 1202. However, if the content detection module 116 determines that there are no additional processing passes to execute ("no" at decision block 1212), the process 1200 may terminate at block 1214.

The sequential digital image panning techniques disclosed herein may enable a user to continuously and sequentially move around different expanded portions of a digital image without resorting to manually panning around digital image. Accordingly, the sequential digital image panning techniques described herein may alleviate content confusion problems caused manually panning around the digital image, while providing a user with the ability to view the content of the digital image on an electronic display entirely while in zoom mode.

CONCLUSION

Although the subject matter has been described in language specific to structural features and/or methodological acts, it is to be understood that the subject matter defined in the appended claims is not necessarily limited to the specific features or acts described. Rather, the specific features and acts are disclosed as illustrative forms of implementing the claims.

What is claimed is:

1. A computer implemented method, comprising:
under control of one or more computing systems configured with executable instructions,
designating at least a portion of a digital image as a content region and at least another portion of the digital image as a non-content region;
determining a content portion width based at least in part on a width of the digital image and a magnification factor;
identifying a plurality of content portions that include text from the content region based at least in part on the content portion width;
determining word divisions within text content in a content portion of the plurality of content portions;
altering a boundary of the content portion to decrease the determined content portion width and terminate the boundary of the content portion at one of the word divisions to exclude at least one extraneous character from an adjacent word of the text content;
expanding the plurality of content portions for display based at least in part on the magnification factor; and
providing the expanded plurality of content portions for display on an electronic book reader device in a sequential manner.

2. A computer implemented method, comprising:
under control of one or more computing systems configured with executable instructions,
designating at least a portion of a digital image as a content region and at least another portion of the digital image as a non-content region;
determining a content portion width based at least in part on a width of the digital image and a magnification factor;
identifying a plurality of content portions from each content region based at least in part on the content portion width, the plurality of content portions including text;
determining word divisions within text content in a content portion of a plurality of content portions;
altering a boundary of the content portion to decrease the determined content portion width and terminate the boundary of the content portion at one of the word divisions to exclude at least one extraneous character from an adjacent word of the text content; and
expanding the plurality of content portions for display based on the magnification factor.

3. The computer implemented method of claim 2, wherein the designating includes designating at least a portion of the digital image as the content region that includes a plurality of content columns.

4. The computer implemented method of claim 2, wherein the identifying of the plurality of content portions from each content region further comprises identifying content having a width approximately equal to the content portion width.

5. The computer implemented method of claim 2, wherein the designating comprises:
- detecting at least one non-background color pixel in a first line of pixels of the digital image;
- designating the first line of pixels that includes the at least one non-background color pixel as a portion of the content region;
- detecting each pixel in a second line of pixels of the digital image as a background color pixel; and
- designating the second line of pixels as a portion of the non-content region.

6. The computer implemented method of claim 5, wherein the detecting the at least one non-background color pixel includes eliminating an artifact via a color validation check or a density check.

7. The computer implemented method of claim 2, wherein the determining the content portion width includes dividing the width of the digital image by a square root of the magnification factor.

8. The computer implemented method of claim 2, wherein the expanding includes multiplying the content portion width and a height of each content portion by a square root of the magnification factor.

9. The computer implemented method of claim 2, wherein the expanding includes expanding each content portion so that a width of each content portion is equivalent to the width of the digital image.

10. The computer implemented method of claim 2, wherein the expanding includes expanding the digital image that includes the plurality of content portions based at least in part on the magnification factor.

11. The computer implemented method of claim 2, further comprising:
- determining word divisions within additional text content of an additional content portion; and
- shifting a boundary of the additional content portion to terminate the boundary of the additional content portion at one of the word divisions preceding the boundary to exclude at least one extraneous character from an adjacent word of the additional text content.

12. The computer implemented method of claim 2, further comprising identifying an additional content portion having a width that is less than the content portion width from an end of the content region.

13. The computer implemented method of claim 2, further comprising providing the plurality of content portions for display on an electronic device.

14. The computer implemented method of claim 13, wherein the presenting includes expanding at least one content portion based on a ratio between a width of the display and a height of a display of an electronic device.

15. A computer readable medium storing computer-executable instructions that, when executed, cause one or more processors to perform acts comprising:
- designating at least a portion of a digital image as a content region and at least another portion of the digital image as a non-content region;
- identifying a plurality of content portions having a predetermined width from each content region, the plurality of content portions including text;
- determining word divisions within text content in a content portion of the plurality of content portions;
- shifting a boundary of the content portion to terminate the boundary of the content portion at one of the word divisions preceding the boundary to exclude at least one extraneous character from an adjacent word of the text content; and
- expanding the digital image that includes the plurality of content portions to produce a plurality of expanded content portions for display.

16. The computer readable medium of claim 15, wherein the designating includes designating at least a portion of the digital image as the content region that includes a plurality of content columns.

17. The computer readable medium of claim 15, wherein the designating comprises:
- detecting at least one non-background color pixel in a first line of pixels of the digital image;
- designating the first line of pixels that includes the at least one non-background color pixel as a portion of the content region;
- detecting each pixel in a second line of pixels as a background color pixel; and
- designating the second line of pixels as a portion of the non-content region.

18. The computer readable medium of claim 17, wherein the detecting the at least one non-background color pixel includes eliminating an artifact via a color validation check or a density check.

19. The computer readable medium of claim 18, wherein the eliminating of the artifact comprises performing the color validation check, and wherein the performing of the color validation check comprises determining that the non-background pixel is part of the content region when a color of the non-background pixel matches or is within a predetermined deviation range of a dominant color of the digital image.

20. The computer readable medium of claim 18, wherein the eliminating of the artifact comprises performing the density check, and wherein the performing of the density check comprises determining that the non-background pixel is part of the content region when a quantity of additional non-background pixels within a predetermined distance of the non-background pixel meets or exceeds a predetermined threshold.

21. The computer readable medium of claim 15, wherein the expanding includes expanding a particular content portion so that a width of the particular content portion following expansion is greater than the predetermined width.

22. The computer readable medium of claim 15, wherein the predetermined width is determined as a proportion of a width of the display of an electronic device.

23. The computer readable medium of claim 15, further comprising:
- determining additional word divisions within additional text content of an additional content portion; and
- altering a boundary of the additional content portion to decrease a width of the additional content portion and terminate the boundary of the additional content portion at one of the additional word divisions to exclude at least one extraneous character from an adjacent word of the additional text content.

24. The computer readable medium of claim 15, further comprising identifying a content portion having a width that is less than the predetermined width from an end of the content region.

25. The computer readable medium of claim 15, wherein the identifying includes identifying each content portion in response to an activation of a user control.

26. The computer readable medium of claim 15, further comprising providing the plurality of expanded content portions for display on an electronic device.

27. The computer readable medium of claim 26, wherein the presenting includes presenting the at least one content portion at a substantially vertically centered location on a display of the electronic device.

28. The computer readable medium of claim 26, wherein the presenting includes reorienting at least one expanded content portion from an original orientation to an orientation that is perpendicular to the original orientation.

29. A device comprising:
a processor; and
memory storing modules executable by the processor, the modules comprising:
a content detection module to designate at least a portion of a digital image as a content region and at least another portion of the digital image as a non-content region, the content region including one or more lines of text;
a user interface module to receive content display commands inputted via user controls; and
a content expansion module to identify a plurality of content portions from a content region based at least in part on a predetermined width, determine word divisions within text content of a content portion, alter or shift a boundary of the content portion to decrease the predetermined width of the content portion at one of the word divisions to exclude at least one extraneous character from an adjacent word of the text content, and expand the plurality of content portions for display.

30. The device of claim 29, further comprising a display module to sequentially present the plurality of expanded content portions at a substantially vertically centered location on a display of an electronic device.

31. The device of claim 29, wherein the content detection module is to further designate the content region as including a plurality of content columns.

32. The device of claim 29, wherein the content detection module is to designate the content region and the non-content region by:
detecting at least one non-background color pixel in a first line of pixels of the digital image;
designating the first line of pixels that includes the at least one non-background color pixel as a portion of the content region;
detecting each pixel in a second line of pixels of the digital image as a background color pixel; and
designating the second line of pixels as a portion of the at least one non-content region.

33. The device of claim 32, wherein the content detection module is to detect at least one non-background color pixel in a first line of pixels by eliminating an artifact via a color validation check or a density check.

34. The device of claim 29, wherein the modules further comprises a data cache module to store at least one of one or more identified content portions or one or more expanded content portions.

35. The device of claim 29, wherein the content expansion module is to further identify a content portion having a width that is less than the predetermined width from an end of the at least one content region.

36. The device of claim 29, wherein the content expansion module is to identify the plurality of content portions at least partly in response to receiving a display command via the users controls from the user interface module.

37. The device of claim 29, wherein the content expansion module is to expand the plurality of content portions for display without reformatting lines ends of the one or more lines of text in the content region.

* * * * *